United States Patent
Sun et al.

(10) Patent No.: US 12,520,184 B2
(45) Date of Patent: Jan. 6, 2026

(54) CHANNEL INFORMATION FEEDBACK METHOD, COMMUNICATION APPARATUS, AND COMMUNICATION SYSTEM

(71) Applicant: HUAWEI TECHNOLOGIES CO., LTD., Shenzhen (CN)

(72) Inventors: Yingxiang Sun, Shenzhen (CN); Chenchen Liu, Shenzhen (CN); Xiao Han, Shenzhen (CN); Rui Du, Shenzhen (CN); Meihong Zhang, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 322 days.

(21) Appl. No.: 18/341,059

(22) Filed: Jun. 26, 2023

(65) Prior Publication Data

US 2023/0345283 A1    Oct. 26, 2023

Related U.S. Application Data

(63) Continuation of application No. PCT/CN2021/141326, filed on Dec. 24, 2021.

(30) Foreign Application Priority Data

Dec. 28, 2020 (CN) .......................... 202011582356.2

(51) Int. Cl.
    H04W 24/10    (2009.01)
(52) U.S. Cl.
    CPC .................... H04W 24/10 (2013.01)

(58) Field of Classification Search
    None
    See application file for complete search history.

(56) References Cited

U.S. PATENT DOCUMENTS

| 8,594,051 B2 | 11/2013 | Breit et al. |
| 9,077,498 B2 | 7/2015 | Abraham et al. |
| (Continued) | | |

FOREIGN PATENT DOCUMENTS

| CN | 103141045 A | 6/2013 |
| CN | 103337120 | * 10/2013 |
| CN | 110113818 A | 8/2019 |

OTHER PUBLICATIONS

Stacey et al., "Next Generation Wireless LANs: 802.11n and 802.11ac", Cambridge University, Jun. 24, 2013, 28 pages.

(Continued)

*Primary Examiner* — Andre Tacdiran
(74) *Attorney, Agent, or Firm* — Maier & Maier, PLLC

(57) ABSTRACT

A channel information feedback method. The method can be applied to a first wireless device, and includes: receiving a first message from a second wireless device, where the first message notifies channel information measurement, the first message carries first indication information related to the first wireless device, and the first indication information indicates a feedback condition; performing channel information measurement based on the first message; determining a first channel information variation based on currently measured channel information and historically measured channel information; and feeding back a measurement report to the second wireless device when the first channel information variation meets the feedback condition.

20 Claims, 20 Drawing Sheets

(56) References Cited

U.S. PATENT DOCUMENTS

| | | | |
|---|---|---|---|
| 11,910,430 B2* | 2/2024 | Yang | H04W 72/0446 |
| 2006/0154609 A1* | 7/2006 | Takano | H04B 17/29 |
| | | | 455/127.5 |
| 2016/0150435 A1* | 5/2016 | Baek | H04W 24/10 |
| | | | 370/252 |
| 2016/0198385 A1* | 7/2016 | Braun | H04W 36/0094 |
| | | | 455/437 |
| 2017/0104563 A1* | 4/2017 | Lee | H04W 72/121 |
| 2019/0098663 A1* | 3/2019 | Zhang | H04W 72/0446 |
| 2020/0068160 A1* | 2/2020 | Cho | H04N 21/42204 |
| 2020/0383119 A1* | 12/2020 | Sun | H04W 72/542 |
| 2022/0078809 A1* | 3/2022 | Zhou | H04L 5/0044 |

OTHER PUBLICATIONS

Liu et al., "Follow-ups on Channel Measurement Procedure for WLAN Sensing", doc.: IEEE 802.11-20/1120r1, Jun. 13, 2020, 16 pages.

Wu et al., "A Time-Reversal Paradigm for Indoor Positioning System," IEEE Transactions on Vehicular Technology, vol. 64, No. 4, Apr. 2015, pp. 1331-1339.

Li et al., "A New Clustering Algorithm for Processing GPS-Based Road Anomaly Reports With a Mahalanobis Distance," IEEE Transactions on Intelligent Transportation Systems, vol. 18, No. 7, Jul. 2017, 9 pages.

IEEE Computer Society, 802.11n-2009, "IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput", Oct. 29, 2009, 536 pages.

IEEE Computer Society, 802.11ac-2013, "IEEE Standard for Information technology—Telecommunications and information exchange between systems Local and metropolitan area networks—Specific requirements—Part 11: Wireless LAN Medium Access Control (MAC) and Physical Layer (PHY) Specifications—Amendment 4: Enhancements for Very High Throughput for Operation in Bands below 6 GHZ", Dec. 18, 2013, 425 pages.

IEEE Computer Society, P802.11az/D2.0, "Draft Standard for Information technology—Telecommunications and information exchange between systems Local and metropolitan area networks-Specific requirements, Part 11: Wireless LAN Medium Access Control (MAC) and Physical Layer (PHY) Specifications, Amendment 3: Enhancements for positioning", Dec. 2019, 240 pages.

* cited by examiner

CHANNEL INFORMATION FEEDBACK METHOD, COMMUNICATION APPARATUS, AND COMMUNICATION SYSTEM

CROSS-REFERENCE TO RELATED APPLICATIONS

This application is a continuation of International Application No. PCT/CN2021/141326, filed on Dec. 24, 2021, which claims priority to Chinese Patent Application No. 202011582356.2, filed on Dec. 28, 2020. The disclosure of the aforementioned applications are hereby incorporated by reference in their entireties.

TECHNICAL FIELD

Embodiments relate to the field of communication technologies and to a channel information feedback method, a communication apparatus, and a communication system.

BACKGROUND

In a wireless passive sensing technology, a human body action may be sensed by using a radio wave signal reflected on a human body. In a wireless device communication process, a human body action may be specifically sensed based on a channel information change caused by interference of a human body movement to a radio signal, to meet application requirements of wireless sensing such as intrusion detection, elderly care, and indoor head counting.

Currently, there is a channel state information (CSI) measurement technology designed for beamforming or ranging in a wireless communication process. In the existing CSI measurement technology, a receiver device usually measures CSI, and needs to feed back the measured CSI or a packet used for determining the CSI to a transmitter device. This occupies excessive transmission resources. In addition, there is a large amount of data. When the large amount of data is directly used for wireless sensing, efficiency such as wireless sensing application analysis by the transmitter device is reduced.

SUMMARY

Embodiments provide a channel information feedback method, a communication apparatus, and a communication system, to selectively feed back a measurement report related to channel information. This reduces used transmission resources.

According to a first aspect, an embodiment provides a channel information feedback method, applied to a first wireless device and including: receiving a first message from a second wireless device, where the first message notifies channel information measurement, the first message carries first indication information related to the first wireless device, and the first indication information indicates a feedback condition; performing channel information measurement based on the first message; determining a first channel information variation based on currently measured channel information and historically measured channel information; and feeding back a measurement report to the second wireless device when the first channel information variation meets the feedback condition. The first wireless device can selectively feed back, based on the feedback condition indicated by the second wireless device to the first wireless device, the measurement report related to channel information. This reduces transmission resources required for feedback. When the method is applied to wireless sensing, message traffic in wireless sensing measurement can be reduced. This helps improve efficiency of wireless sensing application analysis, and implement a wireless sensing function at a low cost.

In an optional implementation, the first indication information includes a first variation threshold, and the feedback condition is that a channel information variation is greater than or equal to the first variation threshold, or the feedback condition is that a channel information variation is less than or equal to the first variation threshold. The first wireless device determines, based on a single variation threshold indicated by the second wireless device and according to a channel information variation evaluation algorithm used by the first wireless device, a lower limit or an upper limit of a variation that needs to be met by feedback, to selectively feed back the measurement report related to the channel information. This can reduce transmission resources required for feedback.

In an optional implementation, the first indication information includes a second variation threshold and a third variation threshold, and the feedback condition is that a channel information variation is greater than or equal to the second variation threshold, and the channel information variation is less than or equal to the third variation threshold. The first wireless device determines, based on a double variation threshold indicated by the second wireless device, a variation value range that needs to be met by feedback, to selectively feed back the measurement report related to the channel information. This can reduce transmission resources required for feedback.

In an optional implementation, the first indication information includes a first sensitivity level, the first sensitivity level is related to a first variation threshold, and the feedback condition is that a channel information variation is greater than or equal to the first variation threshold, or the feedback condition is that a channel information variation is less than or equal to the first variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a first sensitivity level, the first sensitivity level is related to a second variation threshold and a third variation threshold, and the feedback condition is that a channel information variation is greater than or equal to the second variation threshold, and the channel information variation is less than or equal to the third variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a sensitivity level range, the sensitivity level range includes at least one sensitivity level, and a variation threshold related to the at least one sensitivity level is used for determining the feedback condition. The first wireless device dynamically determines a sensitivity level of the first wireless device based on the sensitivity level range indicated by the second wireless device and with reference to a current situation of the first wireless device, for example, signal received strength, an environment in which the first wireless device is located, and a surrounding detectable target. Further, the feedback condition applicable to the first wireless device is flexibly obtained, and is applicable to wireless sensing scenarios of different sensitivities.

In an optional implementation, the first indication information further includes a first identifier, the first identifier indicates a first channel information variation evaluation algorithm, and the feedback condition is that a channel information variation is greater than or equal to the first variation threshold; or the first identifier indicates a second channel information variation evaluation algorithm, and the feedback condition is that a channel information variation is less than or equal to the first variation threshold. The feedback condition applicable to the first wireless device is indirectly indicated by indicating the first variation threshold and the channel information variation evaluation algorithm to the first wireless device.

In an optional implementation, the first channel information variation evaluation algorithm includes a Mahalanobis distance method, and the second channel information variation evaluation algorithm includes a time-reversal resonating strength method.

In an optional implementation, the first indication information further includes a second identifier that indicates an interval mapping algorithm, and the determining a first channel information variation based on currently measured channel information and historically measured channel information includes:

comparing the currently measured channel information with the historically measured channel information to obtain a second channel information variation; and processing the second channel information variation based on the interval mapping algorithm, to obtain the first channel information variation. The first channel information variation is in a first interval, and the first interval includes the first variation threshold, or the first interval includes the second variation threshold and the third variation threshold. The interval mapping algorithm is indicated, so that the channel information variation determined by the first wireless device through measurement and the related variation threshold are in a same interval. This facilitates comparison between the channel information variation and the related variation threshold, and improves accuracy of selective feedback.

In an optional implementation, the receiving a first message from a second wireless device includes: receiving the first message from the second wireless device at least twice. For the receiving the first message from the second wireless device at any one of the at least twice, the performing channel information measurement based on the first message includes: obtaining a measurement packet from the second wireless device within first duration after the first message is received, where the measurement packet includes a training symbol; and performing channel information measurement once based on the training symbol in the measurement packet.

In an optional implementation, the first indication information further includes a configuration period of a measurement packet, and the measurement packet includes a training symbol; and the performing channel information measurement based on the first message includes: obtaining, within second duration, the measurement packet from the second wireless device once at an interval of the configuration period; and performing channel information measurement once at an interval of the configuration period based on a newly obtained training symbol in the measurement packet. The second wireless device indicates the configuration period of the measurement packet, and needs to initially send the first message only once within a specific valid time (for example, the second duration). This can reduce signaling overheads and transmission resources.

In an optional implementation, the measurement packet includes a null data packet (NDP), and the first message includes a null data packet announcement (NDPA).

In an optional implementation, the first message further carries second indication information, and the second indication information indicates that the measured channel information is used for wireless sensing. The method is applied to wireless sensing. The range that needs to be met by feedback is set for the channel information variation determined by measurement. The first wireless device selectively feeds back the measurement report related to the channel information, to reduce message traffic in wireless sensing measurement. The second wireless device can also quickly learn a status of a detectable target around the first wireless device. This helps improve efficiency of wireless sensing application analysis, and implement a wireless sensing function at a low cost.

According to a second aspect, an embodiment provides a channel information feedback method, applied to a second wireless device and including: sending a first message to at least one first wireless device, where the first message notifies channel information measurement, the first message carries first indication information related to each first wireless device, and the first indication information indicates a feedback condition; and receiving a measurement report from the first wireless device when a channel information variation measured by the first wireless device meets the feedback condition.

In this embodiment, the second wireless device indicates, to the at least one first wireless device, the feedback condition corresponding to the at least one first wireless device, and any first wireless device selectively feeds back the measurement report related to channel information based on the feedback condition corresponding to the first wireless device. This reduces transmission resources required for feedback. When the method is applied to wireless sensing, message traffic in wireless sensing measurement can be reduced. This helps improve efficiency of wireless sensing application analysis, and implement a wireless sensing function at a low cost.

In an optional implementation, the first indication information includes a first variation threshold, and the feedback condition is that a channel information variation is greater than or equal to the first variation threshold, or the feedback condition is that a channel information variation is less than or equal to the first variation threshold. A single variation threshold corresponding to each first wireless device is separately indicated to each first wireless device, and any first wireless device may determine, according to a channel information variation evaluation algorithm used by the first wireless device, a lower limit or an upper limit of a variation that needs to be met by feedback of the first wireless device, to selectively feed back the measurement report related to the channel information. This can reduce transmission resources required for feedback.

In an optional implementation, the first indication information includes a second variation threshold and a third variation threshold, and the feedback condition is that a channel information variation is greater than or equal to the second variation threshold, and the channel information variation is less than or equal to the third variation threshold. A double variation threshold corresponding to each first wireless device is separately indicated to each first wireless device, and any first wireless device may determine a variation value range that needs to be met by feedback of the first wireless device, to selectively feed back the measurement report related to the channel information. This can reduce transmission resources required for feedback.

In an optional implementation, the first indication information includes a first sensitivity level, the first sensitivity level is related to a first variation threshold, and the feedback condition is that a channel information variation is greater than or equal to the first variation threshold, or the feedback condition is that a channel information variation is less than or equal to the first variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a first sensitivity level, the first sensitivity level is related to a second variation threshold and a third variation threshold, and the feedback condition is that a channel information variation is greater than or equal to the second variation threshold, and the channel information variation is less than or equal to the third variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a sensitivity level range, the sensitivity level range includes at least one sensitivity level, and a variation threshold related to the at least one sensitivity level is used for determining the feedback condition. Any first wireless device may dynamically determine a sensitivity level of the first wireless device by indicating the sensitivity level range and with reference to a current situation of the first wireless device, for example, signal received strength, an environment in which the first wireless device is located, and a surrounding detectable target. Further, the feedback condition applicable to the first wireless device is flexibly obtained, and is applicable to wireless sensing scenarios of different sensitivities.

In an optional implementation, the first indication information further includes a first identifier, the first identifier indicates a first channel information variation evaluation algorithm, and the feedback condition is that a channel information variation is greater than or equal to the first variation threshold; or the first identifier indicates a second channel information variation evaluation algorithm, and the feedback condition is that a channel information variation is less than or equal to the first variation threshold. The feedback condition applicable to each first wireless device is indirectly indicated by indicating the first variation threshold and the channel information variation evaluation algorithm to each first wireless device.

In an optional implementation, the first channel information variation evaluation algorithm includes a Mahalanobis distance method, and the second channel information variation evaluation algorithm includes a time-reversal resonating strength method.

In an optional implementation, the first indication information further includes a second identifier that indicates an interval mapping algorithm. The interval mapping algorithm is indicated, so that the channel information variation determined by each first wireless device through measurement and the related variation threshold are in a same interval. This facilitates comparison between the channel information variation and the related variation threshold, and improves accuracy of selective feedback.

In an optional implementation, the sending a first message to at least one first wireless device includes: sending the first message to the at least one first wireless device at least twice. For the sending the first message at any one of the at least twice, the method further includes: sending a measurement packet within first duration after the first message is sent, where the measurement packet includes a training symbol, and the first duration is a time difference between two adjacent times of sending the first message.

In an optional implementation, the first indication information further includes a configuration period of a measurement packet, and the measurement packet includes a training symbol. The second wireless device indicates the configuration period of the measurement packet, and needs to initially send the first message only once within a specific valid time. This can reduce signaling overheads and transmission resources.

In an optional implementation, the measurement packet includes an NDP, and the first message includes an NDPA.

In an optional implementation, the first message further carries second indication information, and the second indication information indicates that the measured channel information is used for wireless sensing. The method is applied to wireless sensing. The range that needs to be met by feedback is set for the channel information variation determined by measurement. In this way, the first wireless device selectively feeds back the measurement report related to the channel information, to reduce message traffic in wireless sensing measurement. The second wireless device can also quickly learn a status of a detectable target around the first wireless device. This helps improve efficiency of wireless sensing application analysis, and implement a wireless sensing function at a low cost.

According to a third aspect, an embodiment provides a communication apparatus. The communication apparatus is applied to a first wireless device. The communication apparatus includes units (also referred to as modules or function modules) configured to perform steps in any optional implementation of the first aspect. For example, the communication apparatus includes a communication module and a processing module. The communication module is configured to receive a first message from a second wireless device, where the first message notifies channel information measurement, the first message carries first indication information related to the first wireless device, and the first indication information indicates a feedback condition; the processing module is configured to perform channel information measurement based on the first message; the processing module is further configured to determine a first channel information variation based on currently measured channel information and historically measured channel information; and the communication module is further configured to feed back a measurement report to the second wireless device when the first channel information variation meets the feedback condition.

In this embodiment, the first wireless device can selectively feed back, based on the feedback condition indicated by the second wireless device to the first wireless device, the measurement report related to channel information. This reduces transmission resources required for feedback. When the method is applied to wireless sensing, message traffic in wireless sensing measurement can be reduced. This helps improve efficiency of wireless sensing application analysis, and implement a wireless sensing function at a low cost.

In an optional implementation, the first indication information includes a first variation threshold, and the feedback condition is that a channel information variation is greater than or equal to the first variation threshold, or the feedback condition is that a channel information variation is less than or equal to the first variation threshold. The first wireless device determines, based on a single variation threshold indicated by the second wireless device to the first wireless device and according to a channel information variation evaluation algorithm used by the first wireless device, a lower limit or an upper limit of a variation that needs to be met by feedback, to selectively feed back the measurement report related to the channel information. This can reduce transmission resources required for feedback.

In an optional implementation, the first indication information includes a second variation threshold and a third variation threshold, and the feedback condition is that a channel information variation is greater than or equal to the second variation threshold, and the channel information variation is less than or equal to the third variation threshold. The first wireless device determines, based on a double variation threshold indicated by the second wireless device, a variation value range that needs to be met by feedback, to selectively feed back the measurement report related to the channel information. This can reduce transmission resources required for feedback.

In an optional implementation, the first indication information includes a first sensitivity level, the first sensitivity level is related to a first variation threshold, and the feedback condition is that a channel information variation is greater than or equal to the first variation threshold, or the feedback condition is that a channel information variation is less than or equal to the first variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a first sensitivity level, the first sensitivity level is related to a second variation threshold and a third variation threshold, and the feedback condition is that a channel information variation is greater than or equal to the second variation threshold, and the channel information variation is less than or equal to the third variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a sensitivity level range, the sensitivity level range includes at least one sensitivity level, and a variation threshold related to the at least one sensitivity level is used for determining the feedback condition. The first wireless device dynamically determines a sensitivity level of the first wireless device based on the sensitivity level range indicated by the second wireless device and with reference to a current situation of the first wireless device, for example, signal received strength, an environment in which the first wireless device is located, and a surrounding detectable target. Further, the feedback condition applicable to the first wireless device is flexibly obtained, and is applicable to wireless sensing scenarios of different sensitivities.

In an optional implementation, the first indication information further includes a first identifier, the first identifier indicates a first channel information variation evaluation algorithm, and the feedback condition is that a channel information variation is greater than or equal to the first variation threshold; or the first identifier indicates a second channel information variation evaluation algorithm, and the feedback condition is that a channel information variation is less than or equal to the first variation threshold. The feedback condition applicable to the first wireless device is indirectly indicated by indicating the first variation threshold and the channel information variation evaluation algorithm to the first wireless device.

In an optional implementation, the first channel information variation evaluation algorithm includes a Mahalanobis distance method, and the second channel information variation evaluation algorithm includes a time-reversal resonating strength method.

In an optional implementation, the first indication information further includes a second identifier that indicates an interval mapping algorithm, and the processing module is further configured to: compare the currently measured channel information with the historically measured channel information to obtain a second channel information variation; and process the second channel information variation based on the interval mapping algorithm, to obtain the first channel information variation. The first channel information variation is in a first interval, and the first interval includes the first variation threshold, or the first interval includes the second variation threshold and the third variation threshold. The interval mapping algorithm is indicated, so that the channel information variation determined by the first wireless device through measurement and the related variation threshold are in a same interval. This facilitates comparison between the channel information variation and the related variation threshold, and improves accuracy of selective feedback.

In an optional implementation, the communication module is configured to receive the first message from the second wireless device at least twice. The communication module is further configured to: for the receiving the first message from the second wireless device at any one of the at least twice, obtain a measurement packet from the second wireless device within first duration after the first message is received, where the measurement packet includes a training symbol; and the processing module is further configured to perform channel information measurement once based on the training symbol in the measurement packet.

In an optional implementation, the first indication information further includes a configuration period of a measurement packet, and the measurement packet includes a training symbol; and the processing module is further configured to: obtain, within second duration, the measurement packet from the second wireless device once at an interval of the configuration period; and perform channel information measurement once at an interval of the configuration period based on a newly obtained training symbol in the measurement packet. The second wireless device indicates the configuration period of the measurement packet, and needs to initially send the first message only once within a specific valid time (for example, the second duration). This can reduce signaling overheads and transmission resources.

In an optional implementation, the measurement packet includes an NDP, and the first message includes an NDPA.

In an optional implementation, the first message further carries second indication information, and the second indication information indicates that the measured channel information is used for wireless sensing. The method is applied to wireless sensing. The range that needs to be met by feedback is set for the channel information variation determined by measurement. The first wireless device selectively feeds back the measurement report related to the channel information, to reduce message traffic in wireless sensing measurement. The second wireless device can also quickly learn a status of a detectable target around the first wireless device. This helps improve efficiency of wireless sensing application analysis, and implement a wireless sensing function at a low cost.

According to a fourth aspect, an embodiment provides a communication apparatus. The communication apparatus is applied to a second wireless device. The communication apparatus includes units (also referred to as modules or function modules) configured to perform steps in any optional implementation of the second aspect. For example, the communication apparatus includes a communication module and a processing module. The processing module is configured to determine at least one first wireless device; the processing module is further configured to determine first indication information related to the at least one first wireless device, where the first indication information indicates a feedback condition; the communication module is configured to send a first message to the at least one first wireless device, where the first message notifies channel information measurement, and the first message carries first indication information related to each first wireless device; and the communication module is further configured to receive a measurement report from the first wireless device when a channel information variation measured by the first wireless device meets the feedback condition.

In this embodiment, the second wireless device indicates, to the at least one first wireless device, the feedback condition corresponding to the at least one first wireless device, and any first wireless device selectively feeds back the measurement report related to channel information based on the feedback condition corresponding to the first wireless device. This reduces transmission resources required for feedback. When the method is applied to wireless sensing, message traffic in wireless sensing measurement can be reduced. This helps improve efficiency of wireless sensing application analysis, and implement a wireless sensing function at a low cost.

In an optional implementation, the first indication information includes a first variation threshold, and the feedback condition is that a channel information variation is greater than or equal to the first variation threshold, or the feedback condition is that a channel information variation is less than or equal to the first variation threshold. A single variation threshold corresponding to each first wireless device is separately indicated to each first wireless device, and any first wireless device may determine, according to a channel information variation evaluation algorithm used by the first wireless device, a lower limit or an upper limit of a variation that needs to be met by feedback of the first wireless device, to selectively feed back the measurement report related to the channel information. This can reduce transmission resources required for feedback.

In an optional implementation, the first indication information includes a second variation threshold and a third variation threshold, and the feedback condition is that a channel information variation is greater than or equal to the second variation threshold, and the channel information variation is less than or equal to the third variation threshold. A double variation threshold corresponding to each first wireless device is separately indicated to each first wireless device, and any first wireless device may determine a variation value range that needs to be met by feedback of the first wireless device, to selectively feed back the measurement report related to the channel information. This can reduce transmission resources required for feedback.

In an optional implementation, the first indication information includes a first sensitivity level, the first sensitivity level is related to a first variation threshold, and the feedback condition is that a channel information variation is greater than or equal to the first variation threshold, or the feedback condition is that a channel information variation is less than or equal to the first variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a first sensitivity level, the first sensitivity level is related to a second variation threshold and a third variation threshold, and the feedback condition is that a channel information variation is greater than or equal to the second variation threshold, and the channel information variation is less than or equal to the third variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a sensitivity level range, the sensitivity level range includes at least one sensitivity level, and a variation threshold related to the at least one sensitivity level is used for determining the feedback condition. Any first wireless device may dynamically determine a sensitivity level of the first wireless device by indicating the sensitivity level range and with reference to a current situation of the first wireless device, for example, signal received strength, an environment in which the first wireless device is located, and a surrounding detectable target. Further, the feedback condition applicable to the first wireless device is flexibly obtained, and is applicable to wireless sensing scenarios of different sensitivities.

In an optional implementation, the first indication information further includes a first identifier, the first identifier indicates a first channel information variation evaluation algorithm, and the feedback condition is that a channel information variation is greater than or equal to the first variation threshold; or the first identifier indicates a second channel information variation evaluation algorithm, and the feedback condition is that a channel information variation is less than or equal to the first variation threshold. The feedback condition applicable to each first wireless device is indirectly indicated by indicating the first variation threshold and the channel information variation evaluation algorithm to each first wireless device.

In an optional implementation, the first channel information variation evaluation algorithm includes a Mahalanobis distance method, and the second channel information variation evaluation algorithm includes a time-reversal resonating strength method.

In an optional implementation, the first indication information further includes a second identifier that indicates an interval mapping algorithm. The interval mapping algorithm is indicated, so that the channel information variation determined by each first wireless device through measurement and the related variation threshold are in a same interval. This facilitates comparison between the channel information variation and the related variation threshold, and improves accuracy of selective feedback.

In an optional implementation, the communication module is configured to send the first message to the at least one first wireless device at least twice. The communication module is further configured to: for the sending the first message at any one of the at least twice, send a measurement packet within first duration after the first message is sent, where the measurement packet includes a training symbol, and the first duration is a time difference between two adjacent times of sending the first message.

In an optional implementation, the first indication information further includes a configuration period of a measurement packet, and the measurement packet includes a training symbol. The second wireless device indicates the configuration period of the measurement packet, and needs to initially send the first message only once within a specific valid time. This can reduce signaling overheads and transmission resources.

In an optional implementation, the measurement packet includes an NDP, and the first message includes an NDPA.

In an optional implementation, the first message further carries second indication information, and the second indication information indicates that the measured channel information is used for wireless sensing. The method is applied to wireless sensing. The range that needs to be met by feedback is set for the channel information variation determined by measurement. In this way, the first wireless device selectively feeds back the measurement report related to the channel information, to reduce message traffic in wireless sensing measurement. The second wireless device can also quickly learn a status of a detectable target around the first wireless device. This helps improve efficiency of wireless sensing application analysis, and implement a wireless sensing function at a low cost.

According to a fifth aspect, an embodiment provides a communication apparatus, including a processor. The processor is coupled to a memory, the memory is configured to store program instructions, and the processor is configured to execute the program instructions, to perform the method in the implementations of the first aspect or the second aspect. The memory may be located inside or outside the apparatus. There are one or more processors.

According to a sixth aspect, an embodiment provides a communication apparatus, including a processor and an interface circuit. The interface circuit is configured to communicate with another apparatus, and the processor is configured to perform the method in the implementations of the first aspect or the second aspect.

According to a seventh aspect, an embodiment provides a communication system, including a communication apparatus configured to perform the method in the implementations of the first aspect, and a communication apparatus configured to perform the method in the implementations of the second aspect.

According to an eighth aspect, an embodiment further provides a chip system, including a processor configured to perform the method in the implementations of the first aspect or the second aspect.

According to a ninth aspect, an embodiment further provides a computer program product. The computer product includes a computer program. When the computer program is run, the method in the implementations of the first aspect or the second aspect is enabled to be performed.

According to a tenth aspect, an embodiment further provides a computer-readable storage medium. The computer-readable storage medium stores instructions, and when the instructions are run on a computer, the method in the implementations of the first aspect or the second aspect is enabled to be performed.

For effects that can be achieved in the fifth aspect to the tenth aspect, refer to effects that can be achieved by corresponding solutions in the first aspect to the second aspect. Details are not described herein again.

DESCRIPTION OF EMBODIMENTS

Figure 1:
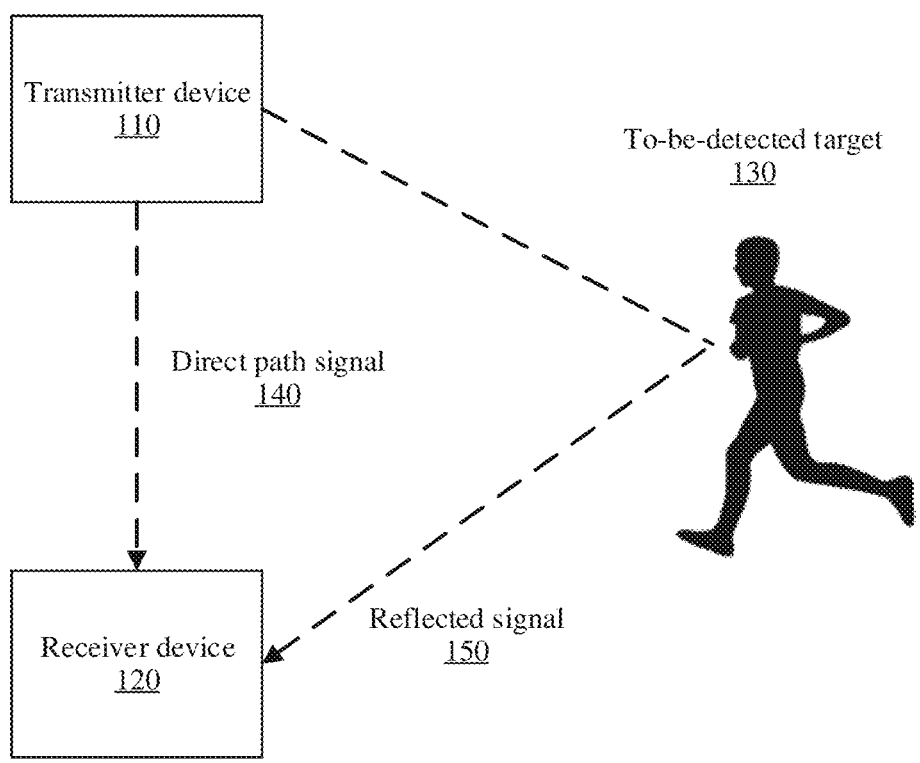
FIG. 1 is a schematic diagram of a principle of wireless sensing.

Embodiments may be applied to a wireless communication network, for example, a Wi-Fi network, a 4G network (for example, LTE), or a 5G network.

In the following, some terms are described, to help a person skilled in the art have a better understanding.

(1) Beamforming

In a wireless communication process, if a transmitter device (also referred to as a wireless device that sends a radio signal) has a plurality of antennas, the transmitter device may adjust a phase and an amplitude of a transmit signal, so that a gain of the antenna increases when the antenna transmits signals in some spatial directions. Similarly, if a receiver device (also referred to as a wireless device that receives a radio signal) has a plurality of antennas, the receiver device may also adjust a phase and an amplitude of a received signal, so that a gain of the antenna increases when the antenna receives signals in some spatial directions.

(2) Channel Information

The channel information is used for reflecting a status of a wireless channel, including channel state information (CSI). In a wireless fidelity (Wi-Fi) protocol, measurement is performed on each orthogonal frequency division multiplexing (OFDM) subcarrier group, to obtain a CSI matrix corresponding to the OFDM subcarrier group. A quantity of rows in the CSI matrix is a quantity of transmit antennas, and a quantity of columns in the CSI matrix is a quantity of receive antennas. An element of each CSI matrix is a complex number including a real part and an imaginary part. Therefore, when there are a large quantity of antennas and a large quantity of subcarriers, an overall data amount of CSI may reach more than 3000 bytes per packet. For example, a quantity of subcarriers is 114, and both a quantity of transmit antennas and a quantity of receive antennas are 4. CSI of each subcarrier is a matrix, and both a quantity of rows and a quantity of columns of the matrix are 4. Each element in the matrix is a complex number. A real part and an imaginary part of the complex number are separately represented by 8 bits. In this way, if CSI on 114 subcarriers is transmitted, 3648 bytes are used for transmission. Even if the CSI on the 114 subcarriers is processed by using a compression algorithm in the Institute of Electrical and Electronics Engineers (IEEE) 802.11ac, an amount of processed data is still in thousands of bytes, and a large quantity of transmission resources are occupied, for example, a large quantity of communication bandwidth resources are consumed.

(3) Training Symbol and Measurement Packet

The training symbol is used for channel information measurement. When channel information is measured, a transmitter device may include a special training symbol in a sent measurement packet. In this way, a receiver device may perform channel information measurement based on a known structure of the training symbol.

In an implementation, a preamble part in the measurement packet includes a sequence known to both the transmitter device and the receiver device. After the receiver device receives the packet, the receiver device extracts the preamble part in the packet, and divides the received preamble part by the known sequence stored at the local end, to obtain corresponding channel information, for example, CSI.

For example, the measurement packet may be a data packet that carries a special training symbol, for example, a null data packet (NDP) or a physical layer protocol data unit (PPDU).

(4) Wireless Passive Sensing

Wireless passive sensing is a technology that senses an action of a to-be-detected target by using a signal reflected by a radio wave on the to-be-detected target (such as a human body).

For example, in a wireless communication technology, various wireless devices have been widely applied to daily life of people. The wireless device may be a mobile phone, a computer, a wireless router, a smart home device, a wireless sensor, a wireless router, or the like. These wireless devices are characterized by a large quantity, low prices, and closeness to users. In a process in which these wireless communication devices perform wireless communication, because a movement of the to-be-detected target (for example, the human body) may cause interference to a radio signal, a wireless channel changes. Therefore, the wireless communication devices may sense movement of a surrounding to-be-detected target based on a change of the wireless channel. In basic principle, the wireless passive sensing technology uses a principle similar to a "human body radar" to sense surrounding human bodies, as shown in FIG. 1.

Referring to FIG. 1, a wireless passive sensing system includes a transmitter device 110 and a receiver device 120. In an actual application process, there may be one or more transmitter devices 110. There may be one or more receiver devices 120. FIG. 1 shows only one transmitter device and one receiver device. The transmitter device 110 and the receiver device 120 may be discrete physical devices, or may be disposed in a same physical device. A radio signal received by the receiver device 120 includes a direct path signal 140 and a reflected signal 150 reflected back by a to-be-detected target 130. When the to-be-detected target 130 moves, the reflected signal 150 also changes. Correspondingly, a superimposed radio signal received by the receiver device 120 also changes. In this case, the receiver device 120 detects that a wireless channel changes. Generally, in a communication protocol, a change of a wireless channel is quantized and represented as a change of channel information (for example, CSI), and may be represented as a change of an amplitude of the CSI and/or a change of a phase of the CSI. That is, the receiver device 120 senses, based on the measured CSI, whether a surrounding target is to be detected or a movement status of the to-be-detected target. Therefore, the wireless passive sensing technology may be widely applied to wireless sensing applications such as intrusion detection, elderly care, gesture recognition, breathing and sleep monitoring, and indoor head counting.

Compared with a conventional sensing technology based on a wearable device such as a camera or a wristband, the wireless passive sensing technology has at least the following advantages: first, the wireless passive sensing technology does not require any hardware cost. An existing wireless communication protocol, such as Wi-Fi, supports presenting interference on a wireless channel in a CSI manner. Second, a user does not need to wear any device, and interference to the user is small. Therefore, the wireless passive sensing technology can monitor the elderly, children, and the like, and also facilitate detection of non-cooperative targets (such as intrusion thieves). Third, the wireless passive sensing technology has little impact on user privacy. In this way, a wireless communication device that implements the wireless passive sensing technology may be deployed in an area such as a bedroom or a bathroom. Fourth, even in poor illumination conditions (if there are obstacles such as curtains and wooden furniture), the wireless passive sensing technology can effectively perform sensing. Additionally, the wireless passive sensing technology can perform multi-room sensing across walls. Fifth, in sensing precision, the wireless passive sensing technology has very high sensing precision, and can sense a weak movement such as breathing.

(5) "A plurality of" means two or more. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects. In addition, it should be understood that although terms such as "first" and "second" may be used in embodiments to describe objects, these objects are not limited by these terms. These terms are merely used for distinguishing between objects.

(6) Terms "including", "having", or any other variant thereof mentioned in descriptions of embodiments are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that, in embodiments, a word such as "example" or "for example" is used to represent giving an example, an illustration, or a description. Any embodiment or design scheme described as "example" or "for example" in embodiments not be explained as being more preferred or having more advantages than another embodiment or design scheme. Exactly, use of the word "example", "for example", or the like is intended to present a related concept in a specific manner.

The following describes an existing solution for measuring CSI.

An existing CSI measurement technology, such as a CSI measurement technology in IEEE 802.11, is designed for beamforming or ranging in a wireless communication process, and does not consider an application requirement of wireless sensing. The existing CSI measurement technology includes the following five types:

The first type is implicit feedback of IEEE 802.11n.

Figure 2:
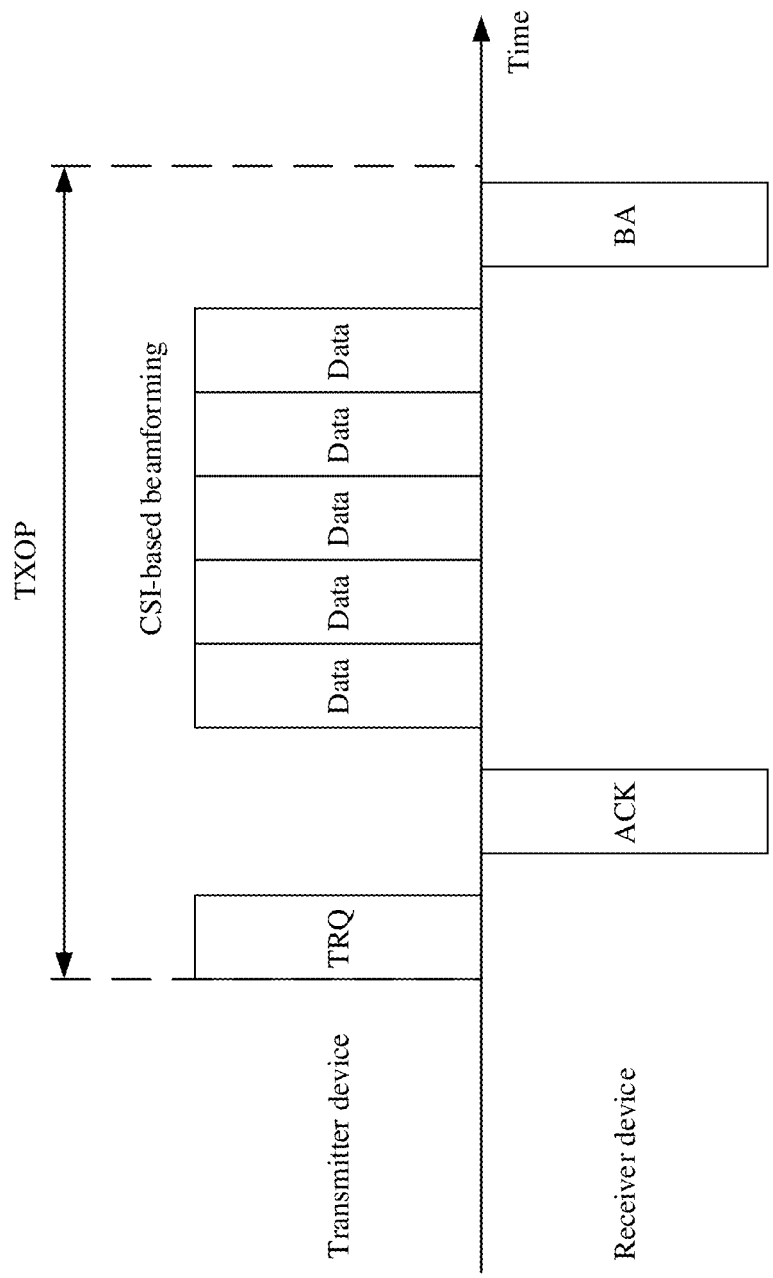
FIG. 2 is a schematic flowchart 1 of a channel state information determining method.

In an implicit feedback method of the IEEE 802.11n, reciprocity (channel reciprocity) of a wireless channel is used. That is, in a bidirectional communication process, channel measurement from the receiver device to the transmitter device is equivalent to channel measurement from the transmitter device to the receiver device. Referring to FIG. 2, processing steps of the implicit feedback method in the IEEE 802.11n include: after the transmitter device obtains a transmit opportunity (TXOP), the transmitter device sends a first packet to the receiver device. Herein, the first packet carries a training request (TRQ). Correspondingly, the receiver device receives the first packet from the transmitter device. In response to the TRQ in the first packet, the receiver device sends an acknowledgement (ACK) response message to the transmitter device. The ACK message includes a training symbol. Correspondingly, the transmitter device receives the ACK message from the receiver device. The transmitter device determines CSI (such as reverse CSI) of a wireless channel from the receiver device to the transmitter device based on the training symbol in the ACK message. Then, CSI of a wireless channel from the transmitter device to the receiver device is inferred based on the reciprocity of the wireless channel and the reverse CSI, and beamforming is performed based on the CSI of the wireless channel from the transmitter device to the receiver device, to determine a beamforming parameter. When sending a packet to the receiver device, the transmitter device may perform beamforming based on the beamforming parameter. The transmitter device transmits the packet to the receiver device by using a formed beam. Correspondingly, the receiver device receives the packet from the transmitter device. The parameter part in the packet is to-be-transmitted data. After the receiver device determines that the packet is successfully received, the receiver device sends a batch acknowledgement (BA) response message to the transmitter device. Correspondingly, the transmitter device receives the BA message from the receiver device. That is, the receiver device does not feed back specific information of the CSI, but feeds back the ACK message that carries the training symbol. In this way, the transmitter device determines the corresponding CSI.

To improve accuracy of the CSI, before the transmitter device determines the CSI, the transmitter device and the receiver device first perform a calibration operation. A specific implementation process of the calibration operation is as follows: after the transmitter device obtains a TXOP, the transmitter device sends the TRQ to the receiver device, to request the receiver device to perform calibration. Then, the transmitter device and the receiver device transmit a packet that carries the training symbol to each other, so that each device can determine the CSI based on the packet that carries the training symbol. Finally, the receiver device feeds back the determined CSI to the transmitter device. The transmitter device compares the CSI fed back by the receiver device with the CSI determined by the transmitter device, to implement calibration and reduce a channel reciprocity deviation caused by a hardware factor. After calibration, a channel status from the transmitter device to the receiver device is inferred based on the CSI from the receiver device to the transmitter device, and the receiver device does not need to feed back the specific information of the CSI to the transmitter device, and the CSI can be determined within one TXOP.

However, the implicit feedback method in the IEEE 802.11n is closely combined with data transmission, and is applicable to a scenario of data transmission on a single link.

The second type is explicit feedback of IEEE 802.11n.

In an explicit feedback method of the IEEE 802.11n, the receiver device directly explicitly feeds back CSI to the transmitter device, and a calibration process is not required.

Figure 3:
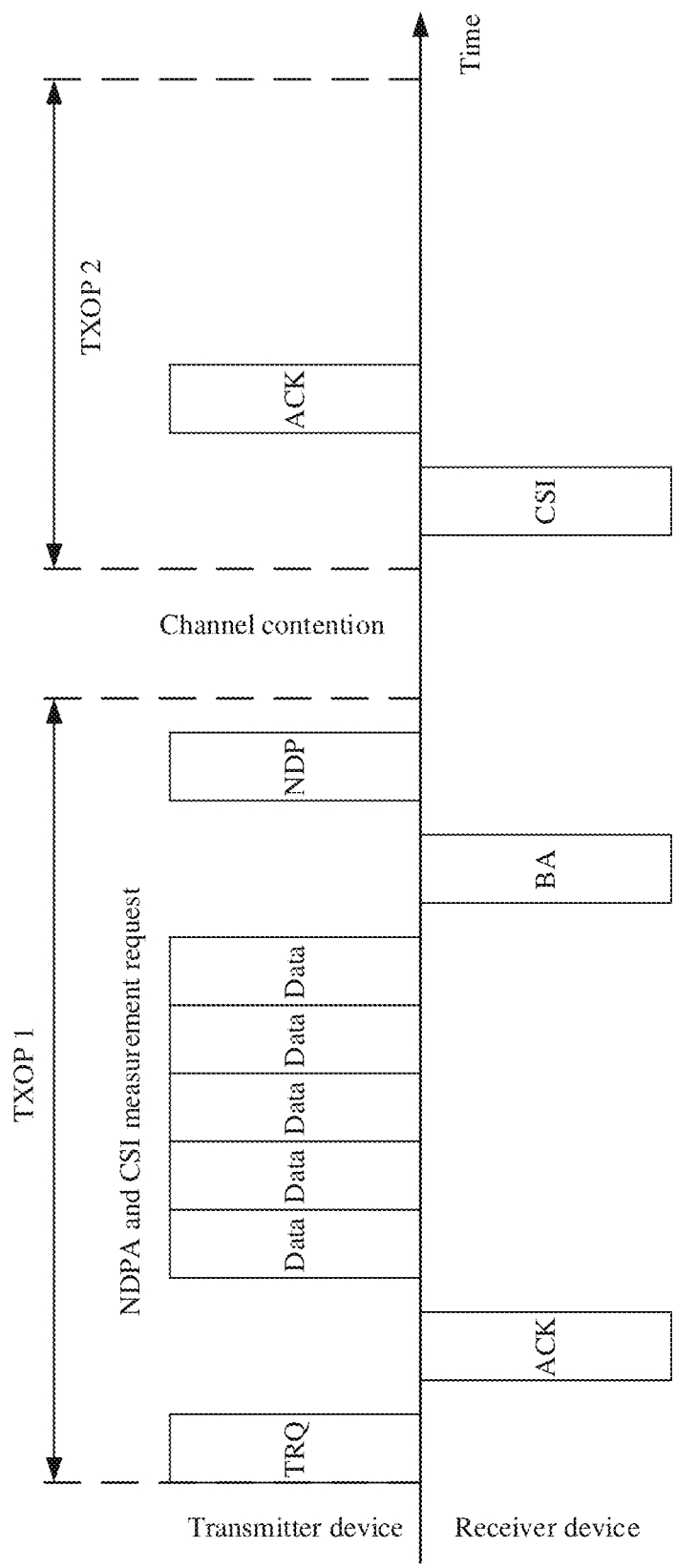
FIG. 3 is a schematic flowchart 2 of a channel state information determining method.

Referring to FIG. 3, processing steps of the explicit feedback method in the IEEE 802.11n include: the transmitter device obtains a TXOP, that is, a TXOP 1 in FIG. 3. Within the TXOP 1, the transmitter device sends a packet to the receiver device. The packet includes a null data packet announcement (NDPA) and a CSI measurement request, to notify the receiver device of preparing for CSI measurement. Correspondingly, the receiver device receives the packet from the transmitter device. Within the TXOP 1, the receiver device sends a BA message to the transmitter device, to notify the transmitter device that the packet is received. Correspondingly, the transmitter device receives the BA message from the receiver device. Within the TXOP 1, the transmitter device sends a null data packet (NDP) to the receiver device. Correspondingly, the receiver device receives the NDP from the transmitter device. One TXOP (such as the TXOP 1) obtained by the transmitter device ends. The receiver device determines the CSI based on the NDP, and obtains a TXOP, that is, a TXOP 2, through channel contention. Within the TXOP 2, the receiver device sends the CSI to the transmitter device. Correspondingly, the transmitter device receives the CSI from the receiver device. Within a next TXOP (for example, a TXOP after the TXOP 2) obtained by the transmitter device, the transmitter device performs beamforming processing based on the CSI. The CSI is carried in a CSI response frame (action frame), a non-compressed beamforming response frame (non-compressed beamforming action frame), or a compressed beamforming response frame (compressed beamforming action frame), and data of the CSI may be compressed data or non-compressed data.

The third type is a multi-user multiple-input multiple-output (MU-MIMO) system of IEEE 802.11ac.

An IEEE 802.11ac MU-MIMO method supports a multi-user simultaneous transmission protocol, and the transmitter device requests a plurality of receiver devices to simultaneously perform measurement. The transmitter device may be an access point (access point, AP).

Figure 4:
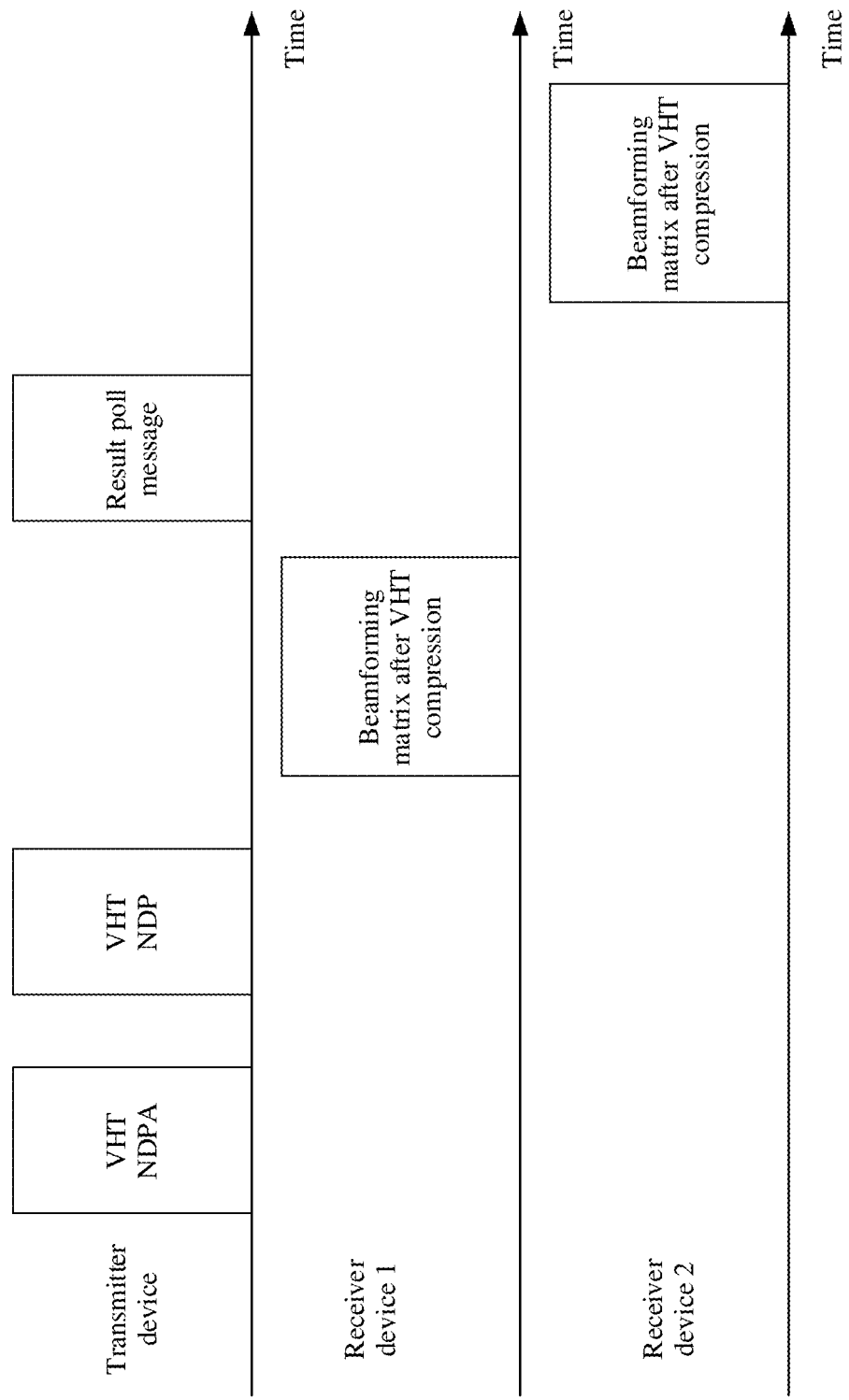
FIG. 4 is a schematic flowchart 3 of a channel state information determining method.

Referring to FIG. 4, processing steps of the IEEE 802.11ac MU-MIMO method include: the transmitter device separately sends an NDPA in a very high throughput (VHT) format to the plurality of receiver devices, to notify the plurality of receiver devices that channel measurement is to be performed. Correspondingly, the plurality of receiver devices separately receive the NDPA in the VHT format from the transmitter device. Then, the transmitter device separately sends an NDP in the VHT format to the plurality of receiver devices. Correspondingly, the plurality of receiver devices separately receive the NDP from the transmitter device. The plurality of receiver devices separately determine corresponding CSI based on the NDP. After determining the CSI, the first receiver device feeds back the CSI to the transmitter device according to the CSI format indicated by the NDPA. Then, the transmitter device sequentially performs result poll (polling) processing, and sends a result poll message to a receiver device other than the first receiver device in the plurality of receiver devices, to request a corresponding receiver device to feed back the CSI to the transmitter device. Correspondingly, after receiving the result poll message, the receiver device other than the first receiver device in the plurality of receiver devices feeds back the CSI to the transmitter device. In a scenario shown in FIG. 4, only two receiver devices are shown: a receiver device 1 and a receiver device 2. The receiver device 1 is the "first receiver device", and the receiver device 2 is the "receiver device other than the first receiver device in the plurality of terminal devices".

The fourth type is a ranging method of IEEE 802.11az.

Figure 5:
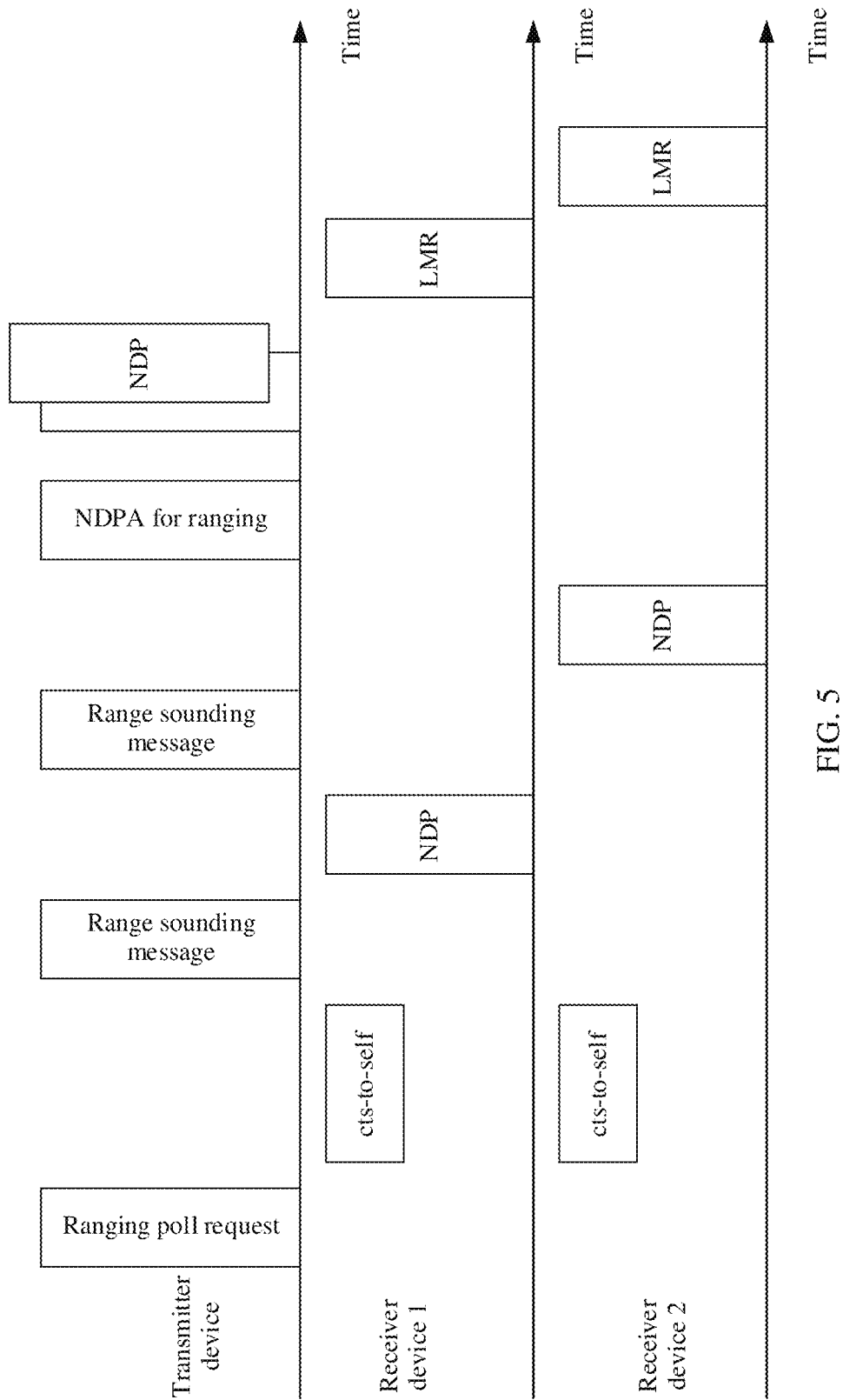
FIG. 5 is a schematic flowchart 4 of a channel state information determining method.

In a ranging method of IEEE 802.11az, CSI is used for performing ranging. Referring to FIG. 5, processing steps of the ranging method of the IEEE 802.11az include: The transmitter device separately sends ranging poll requests to the plurality of receiver devices, and correspondingly, the plurality of receiver devices separately receive the ranging poll requests from the transmitter device. If the receiver device determines to participate in ranging, the receiver device sends a clear-to-send (cts-to-self) message to the transmitter device, to notify the transmitter device to participate in ranging. Subsequently, the transmitter device sequentially sends a range sounding message to the plurality of receiver devices, to notify a corresponding receiver device to feed back an NDP. Correspondingly, the receiver device receives the range sounding message from the transmitter device. Then, the receiver device sends the NDP to the transmitter device. Correspondingly, the transmitter device receives the NDP from the receiver device. The transmitter device determines the CSI based on the NDP. After the transmitter device obtains the CSI from the receiver device to the transmitter device, the transmitter device sends an NDPA used for ranging to the receiver device, to notify the receiver device that CSI measurement is to be performed. Subsequently, the transmitter device sends the NDP to the receiver device. Correspondingly, the receiver device receives the NDP from the transmitter device. The receiver device determines the CSI based on the NDP. The receiver device carries the CSI in a location measurement report (LMR), and feeds back the LMR to the transmitter device. Correspondingly, the transmitter device receives the LMR from the receiver device. In this way, the transmitter device may obtain CSI sent in an uplink direction and CSI sent in a downlink direction, and perform ranging based on the CSI in the two directions. In a scenario shown in FIG. 5, only two receiver devices are shown: a receiver device 1 and a receiver device 2. The receiver device 1 is the "first receiver device", and the receiver device 2 is the "receiver device other than the first receiver device in the plurality of terminal devices".

The fifth type is to determine CSI by broadcasting an NDP.

Figure 6:
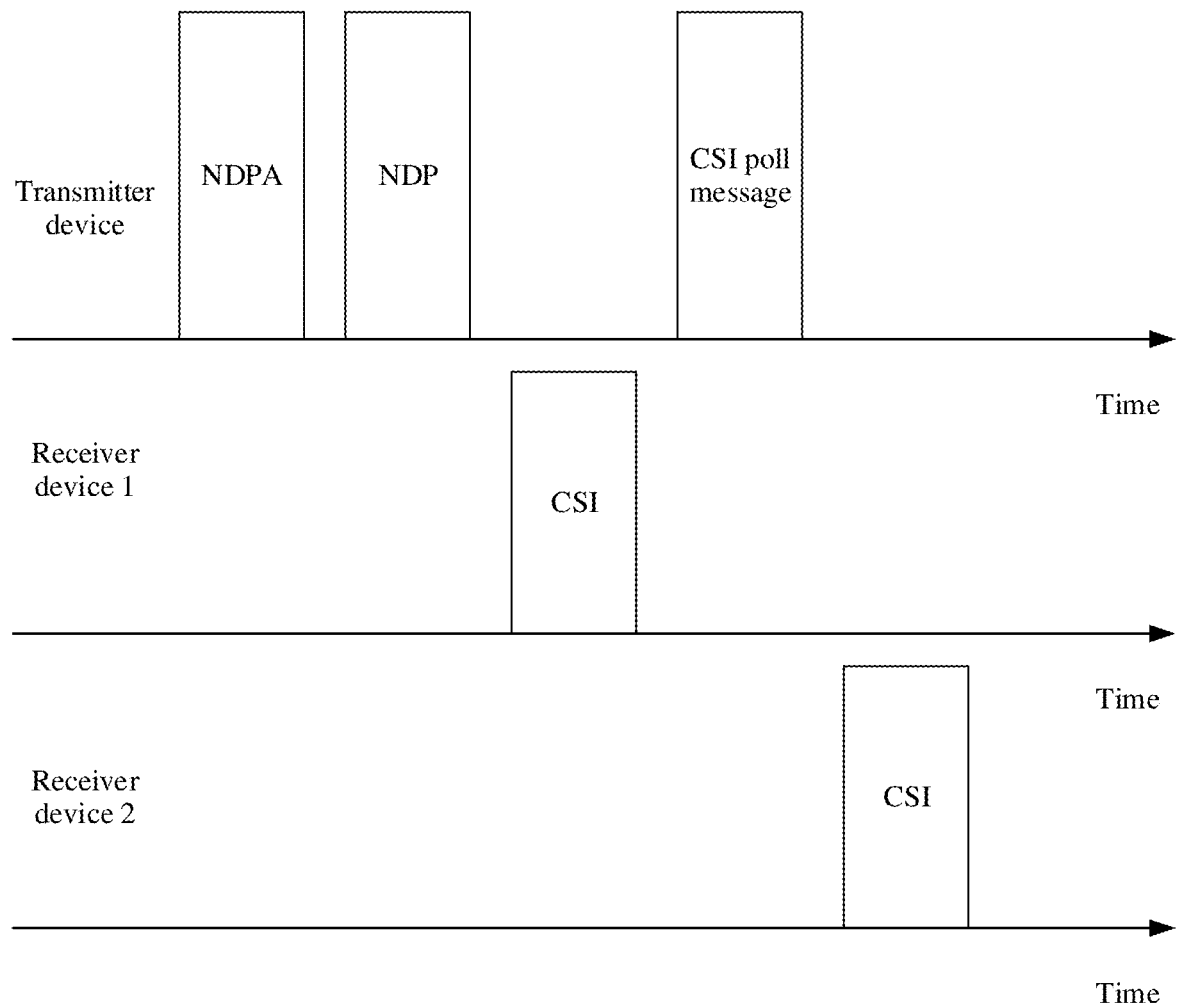
FIG. 6 is a schematic flowchart 5 of a channel state information determining method.

Referring to FIG. 6, processing steps of the determining CSI by broadcasting an NDP includes: the transmitter device separately sends an NDPA to the plurality of receiver devices, and correspondingly, the receiver device separately receives the NDPA from the transmitter device. The NDPA indicates that the receiver device is to perform CSI measurement. Subsequently, the transmitter device separately sends an NDP to the plurality of receiver devices. Correspondingly, the receiver devices separately receive the NDP from the transmitter device. The receiver device determines the CSI based on the NDP. In addition, the NDPA further indicates the first receiver device to feed back the CSI. The first receiver device sends the CSI to the transmitter device in response to the NDPA. The first receiver device may feed back a part of channel information to the transmitter device, or may feed back, to the transmitter device, information indicating that a channel does not change. Subsequently, the transmitter device sends a CSI poll message to another receiver device other than the first receiver device in the plurality of receiver devices, to request the another receiver device other than the first receiver device in the plurality of receiver devices to feed back the CSI. Correspondingly, the another receiver device other than the first receiver device in the plurality of receiver devices separately receives the CSI poll message from the transmitter device and feeds back the CSI to the transmitter device based on the CSI poll message. In a scenario shown in FIG. 6, only two receiver devices are shown: a receiver device 1 and a receiver device 2. The receiver device 1 is the "first receiver device", and the receiver device 2 is the "receiver device other than the first receiver device in the plurality of receiver devices".

Thus, the existing CSI measurement technology is usually for beamforming or ranging, and each receiver device feeds back a message to the transmitter device. However, in a wireless sensing application scenario, most objects in an environment are static. If each receiver device feeds back a message to the transmitter device, excessive transmission resources may be occupied. In addition, there is a large amount of data. When the large amount of data is directly used for wireless sensing, efficiency such as wireless sensing application analysis by the transmitter device is reduced.

In view of this, an embodiment provides a channel information feedback method. The transmitter device may indicate a feedback condition to the receiver device, and the receiver device selectively feeds back a measurement report related to channel information based on the feedback condition. This can reduce transmission resources required for feedback and an amount of data, and helps improve efficiency of wireless sensing application analysis.

The channel information feedback method provided in embodiments may be applied to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a 5G new radio (NR) system, a universal mobile telecommunications system (UMTS), a worldwide interoperability for microwave access (WiMAX) system, a wireless local area network (WLAN) system, or a Wi-Fi system.

Figure 7:
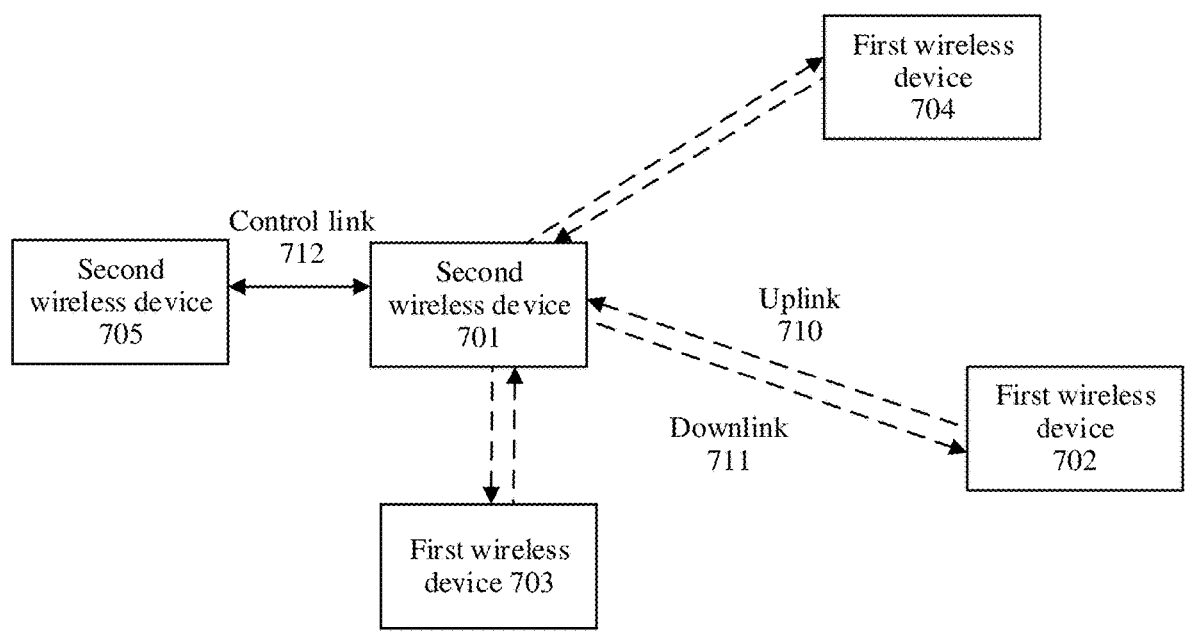
FIG. 7 is a diagram of an architecture of a communication system according to an embodiment.

The following uses a Wi-Fi system as an example for description. Referring to FIG. 7, the Wi-Fi system includes a second wireless device and a first wireless device. The first wireless device may be a station (STA), or may be a terminal device such as a mobile phone or a tablet computer, or may be a device that integrates a Wi-Fi function in a home or office environment, such as a printer, a smart television, or a smart light bulb. The second wireless device may be an AP, or may be a terminal device, such as a mobile phone or a tablet computer. The second wireless device may be configured to: communicate with the first wireless device by using a wireless local area network, and transmit data from the first wireless device to a network side, or transmit data from a network side to the first wireless device. There may be one or more second wireless devices. FIG. 7 shows only two second wireless devices, such as a second wireless device 701 and a second wireless device 705. There may be one or more first wireless devices. FIG. 7 shows only three first wireless devices, such as a first wireless device 702, a first wireless device 703, and a first wireless device 704. A link on which the second wireless device receives information of the first wireless device is referred to as an uplink, for example, an uplink 710 shown by a dashed line with an arrow in FIG. 7. A link on which the second wireless device sends information to the first wireless device is referred to as a downlink, for example, a downlink 711 shown by a dashed line with an arrow in FIG. 7. A link between the second wireless devices is referred to as a control link, for example, a control link 712 shown by a solid line with a double-headed arrow in FIG. 7. The control link may be a wired connection or a wireless connection. Information is transmitted between the second wireless devices, to coordinate monitoring and meet an application requirement of wireless sensing. It should be understood that embodiments are described only by using a Wi-Fi system as an example, but embodiments are not limited thereto. The method and the apparatus in embodiments may also be applied to another communication system. Similarly, in this embodiment, an AP and a STA in the Wi-Fi system are used as an example for description, but this does not indicate that this embodiment is limited to this example. The solutions in embodiments may be further applied to a network device and a terminal device in another communication system. In an implementation, the network device implements functions of the second wireless device in this embodiment, and the terminal device implements functions of the first wireless device in this embodiment ion.

This embodiment focuses on a transmission process between the second wireless device and the first wireless device. The second wireless device is responsible for notifying the first wireless device to measure channel information and indicating a feedback condition to the first wireless device. The second wireless device may also be described as a main control node or the foregoing transmitter device. The first wireless device is responsible for measuring the channel information and determining, based on the feedback condition indicated by the second wireless device, whether to feed back a measurement packet related to the channel information. The first wireless device may also be described as a measurement node or the foregoing receiver device.

For example, an application scenario in this embodiment includes the following two typical scenarios.

A first typical scenario is applied to a home environment.

Figure 8:
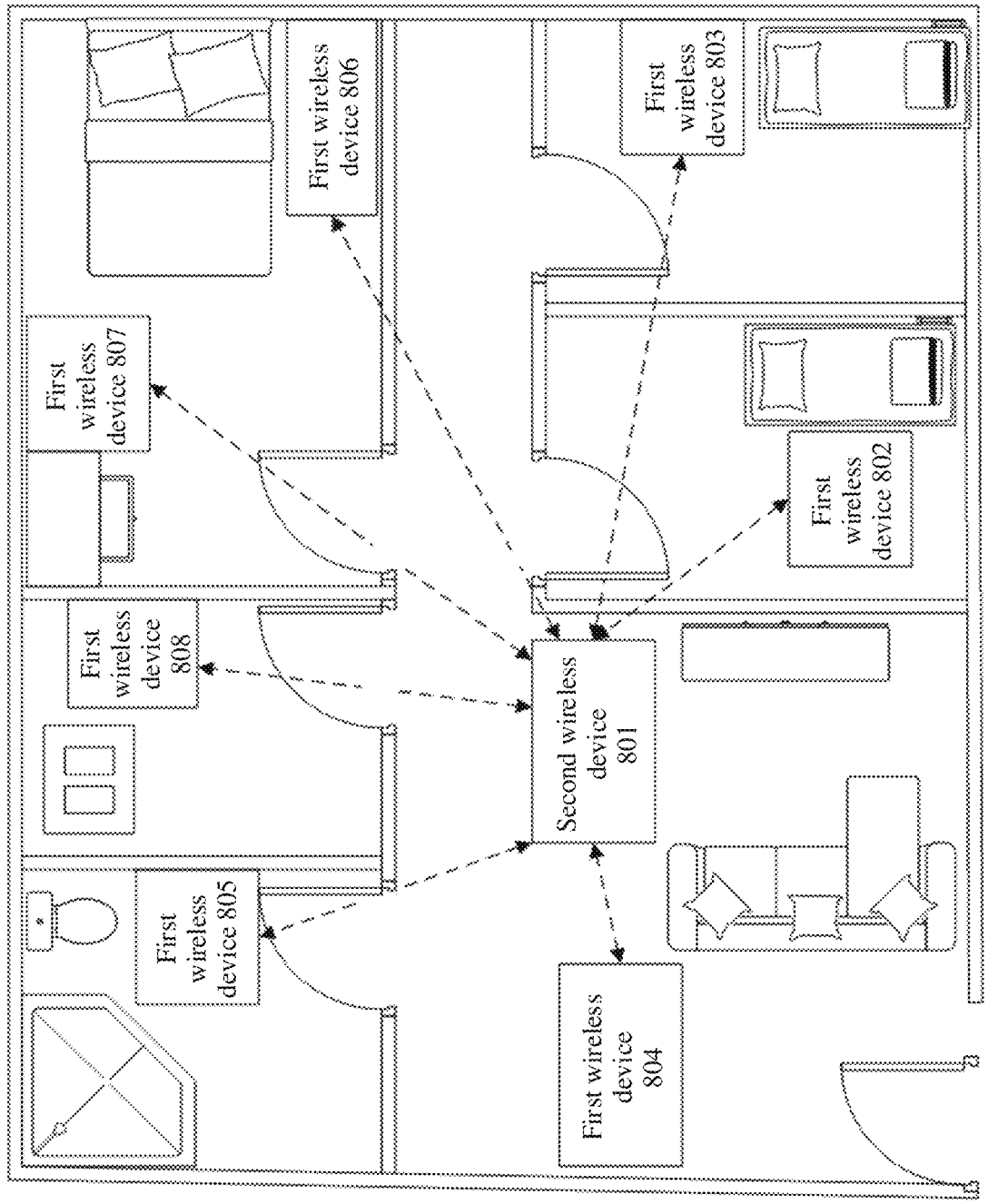
FIG. 8 is a schematic diagram of an application scenario according to an embodiment.

Referring to FIG. 8, in a home environment, there may be one second wireless device, and the second wireless device is disposed in a living room. There may be a plurality of first wireless devices, and the plurality of first wireless devices are separately disposed in a bedroom, a bathroom, and the like. The second wireless device and the first wireless device monitor the entire home environment. In FIG. 8, a dashed line with an arrow represents a link between the second wireless device and the first wireless device. In a scenario shown in FIG. 8, a second wireless device 801 separately exchanges information with a first wireless device 802, a first wireless device 803, and a first wireless device 806 in the bedroom, to monitor a sleep condition of a user. The second wireless device 801 exchanges information with a first wireless device 804 in the living room, to monitor a condition of the living room. The second wireless device 801 exchanges information with a first wireless device 805 in the bathroom, to monitor a condition of the bathroom. After detecting a slipping action of a human body, the second wireless device 801 may send an alarm to a device of a medical institution, to notify medical personnel to perform rescue in time. The second wireless device 801 exchanges information with a first wireless device 807 in the bedroom, to monitor a condition of the bedroom. The second wireless device 801 exchanges information with a first wireless device 808 in a kitchen, to monitor a condition of the kitchen.

A second typical scenario is applied to a to-be-monitored area specified in an industrial environment, or applied to a to-be-monitored area specified in a scenario of a commercial environment.

Figure 9:
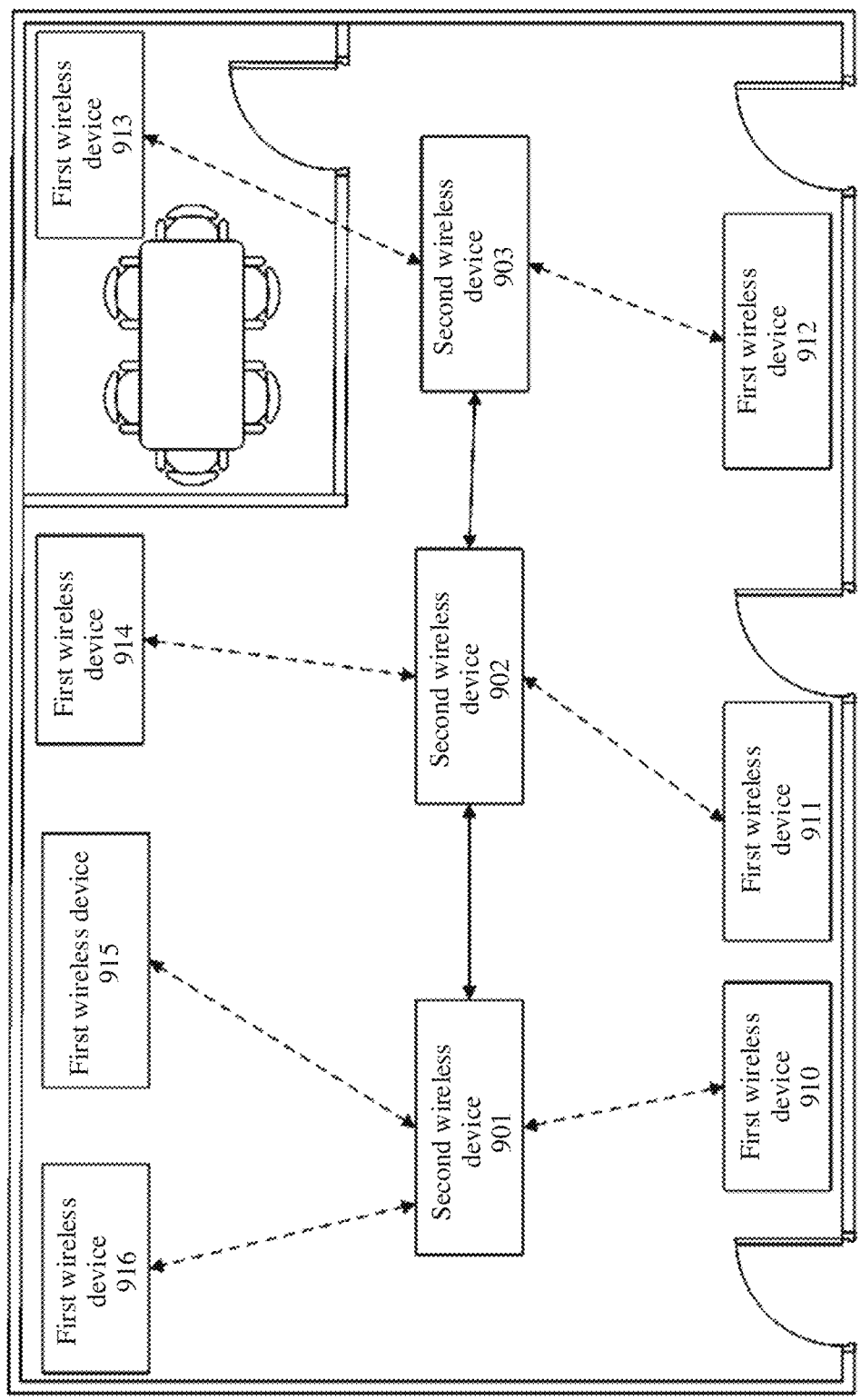
FIG. 9 is a schematic diagram of another application scenario according to an embodiment.

Referring to FIG. 9, when the to-be-monitored area is large, there may be a plurality of second wireless devices. In a scenario shown in FIG. 9, three second wireless devices are disposed: a second wireless device 901, a second wireless device 902, and a second wireless device 903. The three second wireless devices are disposed in a central area of the to-be-monitored area. A solid line with a double-headed arrow between the two second wireless devices represents a link between the two second wireless devices. There may also be a plurality of first wireless devices. The plurality of first wireless devices are: a first wireless device 910, a first wireless device 911, a first wireless device 912, a first wireless device 913, a first wireless device 914, a first wireless device 915, and a first wireless device 916. The first wireless device 910, the first wireless device 911, and the first wireless device 912 are disposed in an area near an exit/entrance of the to-be-monitored area. The first wireless device 913 is disposed in a conference room. The first wireless device 914, the first wireless device 915, and the first wireless device 916 are disposed in an edge area of the to-be-monitored area. A dashed line with a double-headed arrow between a second wireless device and a first wireless device represents a link between the second wireless device and the first wireless device. For example, in the scenario shown in FIG. 9, the second wireless device 901 exchanges information with the first wireless device 910, to monitor a getting in/out condition of the exit/entrance of the to-be-monitored area. The second wireless device 903 exchanges information with the first wireless device 913, to collect statistics on occupancy of the conference room and/or a quantity of persons in the conference room.

The communication system and the application scenario described in the embodiments are intended to more clearly describe the solutions in the embodiments, and do not constitute a limitation on the solutions provided in the embodiments.

The following describes in detail a channel information feedback method provided the in embodiments, and interaction between the first wireless device and the second wireless device.

Figure 10:
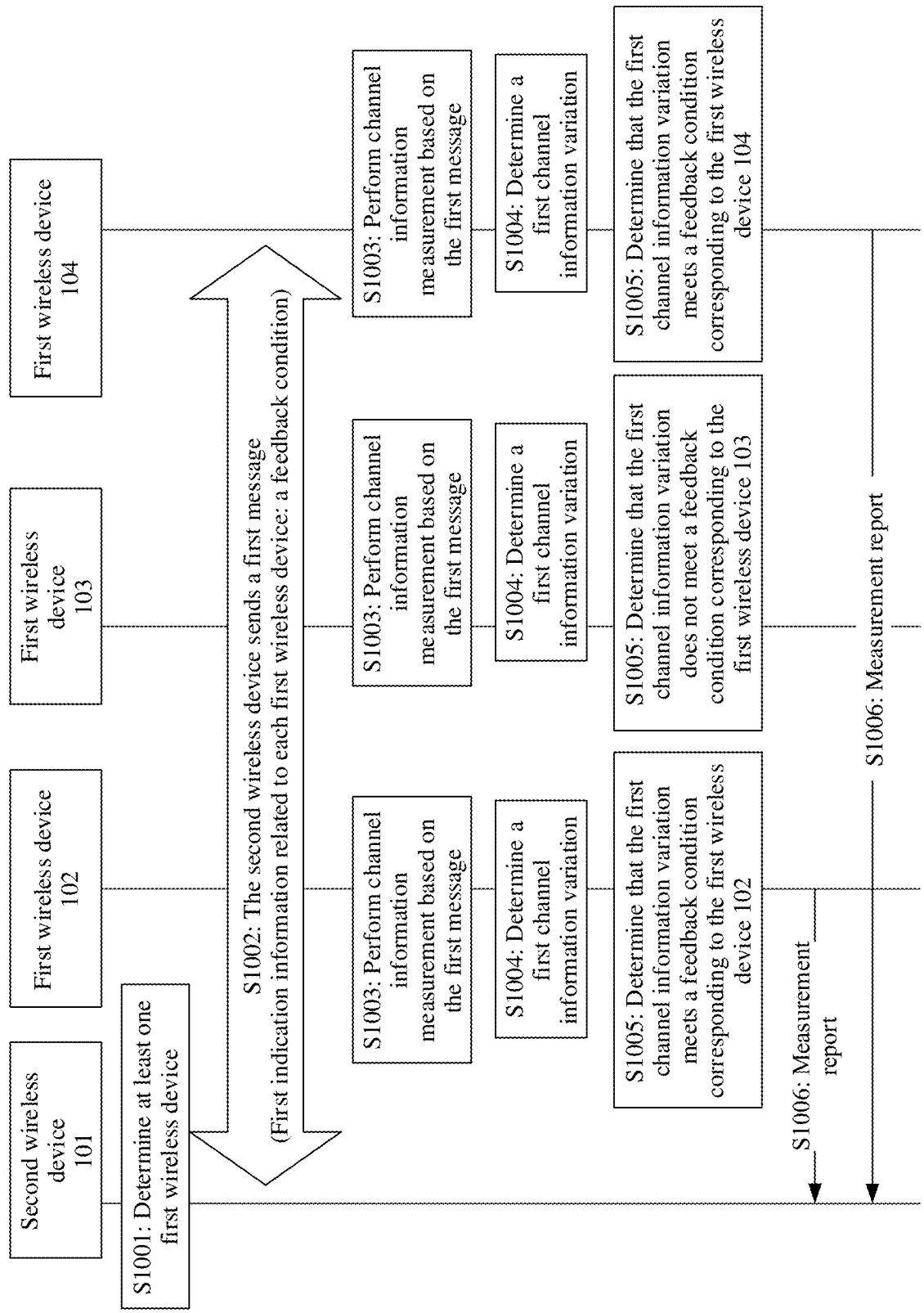
FIG. 10 is a schematic flowchart of a channel information feedback method according to an embodiment.

FIG. 10 is a schematic flowchart of a channel information feedback method according to an embodiment. The method includes the following steps.

S1001: A second wireless device determines at least one first wireless device. The at least one first wireless device needs to participate in channel information measurement.

In an optional implementation, the second wireless device may select at least one first wireless device in an idle state to participate in channel information measurement. For example, in the foregoing Wi-Fi system, the second wireless device is an AP, and the first wireless device is a STA. The AP may send a sensing poll frame to all STAs in a range of the AP, to query whether each STA is idle, and schedule the STA. An idle (available) STA sends a CTS frame for response, and participates in a current round of channel information measurement. A busy or non-idle (unavailable) STA does not respond to, that is, does not participate in the current round of channel information measurement. In this case, the AP may determine, based on the received clear-to-send (CTS) frame, which STAs are idle, to determine at least one STA that needs to participate in channel information measurement. In another optional implementation, the second wireless device may also specify at least one first wireless device to participate in channel information measurement. It should be noted that S1001 may be used as an optional step, that is, the second wireless device may not perform S1001, but directly perform S1002.

S1002: The second wireless device sends a first message to the at least one first wireless device, where the first message notifies channel information measurement, the first message carries first indication information related to each first wireless device, and the first indication information indicates a feedback condition.

Optionally, the second wireless device may carry, in the first message, an identifier of each first wireless device and first indication information corresponding to each identifier. In this way, the first message carries the first indication information related to each first wireless device. The identifier of the first wireless device is indication information that can represent (also referred to as indicate) the first wireless device. For example, the identifier of the first wireless device may be an association identifier of the first wireless device, a device identifier of the first wireless device, or the like.

For any one of the foregoing at least one first wireless device, the first wireless device may obtain first indication information related to the first wireless device from the received first message, and determine a feedback condition indicated by the first indication information, or may be understood as determining a feedback condition applicable to the first wireless device. First indication information related to different first wireless devices may be the same or may be different. For differentiation, FIG. 10 shows one second wireless device 101 and three first wireless devices: a first wireless device 102, a first wireless device 103, and a first wireless device 104. The first wireless device 102 is used as an example. The first wireless device 102 may obtain, from the received first message, first indication information related to the first wireless device 102, and determine a feedback condition applicable to the first wireless device 102. An implementation in which the second wireless device indicates the feedback condition by using the first indication information is described in detail in subsequent content.

Optionally, the first message further carries second indication information, and the second indication information indicates that the measured channel information is used for wireless sensing.

S1003: For any one of the first wireless devices indicated above, the first wireless device performs channel information measurement based on the first message.

In an optional implementation, in the foregoing step S1002, the second wireless device may send the first message to the at least one first wireless device for a plurality of times, and send a measurement packet after each sending of the first message and before a next sending of the first message. The measurement packet includes a training symbol. Based on this, for any one of the at least one first wireless device, the first wireless device may receive the first message and the measurement packet from the second wireless device at least twice. The measurement packet may be an NDP. Optionally, the first message may be implemented by using an NDPA.

For example, for the receiving the first message from the second wireless device at any one of the at least twice, the first wireless device may perform channel information measurement with reference to the following procedure: the first wireless device obtains the measurement packet from the second wireless device within first duration after the first message is received. The measurement packet includes a training symbol, and the first duration indicates a time difference between two times of sending the first message by the second wireless device. The first wireless device performs channel information measurement once based on the training symbol in the measurement packet. By analogy, if the second wireless device sends the first message and the measurement packet N times, the first wireless device may perform channel information measurement N times.

In another optional implementation, the second wireless device may include a configuration period of a measurement packet in the first indication information, and the measurement packet includes a training symbol. The measurement packet may be an NDP. Optionally, the first message may be implemented by using an NDPA. In this case, that the first wireless device performs channel information measurement based on the first message may be implemented in the following manner: the first wireless device obtains, within second duration, the measurement packet from the second wireless device once at an interval of the configuration period; and the first wireless device performs channel information measurement once at an interval of the configuration period based on a newly obtained training symbol in the measurement packet. Duration corresponding to the configuration period is less than the second duration. Optionally, the second duration may be duration in which the second wireless device obtains a transmit opportunity (TXOP). In this case, the first wireless device may perform, based on the configuration period, channel information measurement for a plurality of times within duration corresponding to the foregoing TXOP. The second wireless device indicates the configuration period of the measurement packet, and needs to initially send the first message only once within a specific valid time. This can reduce signaling overheads and transmission resources.

In addition, the first message may alternatively be a broadcast message including an MPDU (MAC protocol data unit), a TRQ bit in an "HT control" field is set to 1, and the MPDU carries a training symbol. The second wireless device may send the first message for a plurality of times, so that the first wireless device obtains the MPDU once, and may perform channel information measurement once based on the training symbol in the MPDU.

Further, optionally, each time the first wireless device performs channel information measurement, the first wireless device stores a measurement result, such as channel information measured this time, to facilitate subsequent calculation of a channel information variation.

S1004: For any one of the first wireless devices indicated above, the first wireless device determines a first channel information variation based on currently measured channel information and historically measured channel information.

The historically measured channel information may be channel information measured last time relative to current measurement; or the historically measured channel information may alternatively be an average of channel information measured previously relative to current measurement. The first channel information variation represents a variation degree of a current wireless channel relative to a previous wireless channel, and is quantized as a variation value of the channel information.

S1005: For any one of the first wireless devices indicated above, the first wireless device feeds back a measurement report to the second wireless device when the first channel information variation meets the feedback condition.

The measurement report may include a measurement result, for example, measured channel information, or the measurement report may include a related packet used for determining channel information. Optionally, the first wireless device may actively feed back the measurement report to the second wireless device when determining that the first channel information variation meets the feedback condition, or may feed back the measurement report to the second wireless device when receiving a feedback indication from the second wireless device.

For example, in this embodiment, S1006 in FIG. 10 shows a case in which the first wireless device 102 and the first wireless device 104 feed back the measurement report to the second wireless device 101, but the first wireless device 103 feeds back no measurement report to the second wireless device 101.

In this embodiment, the second wireless device indicates, to the at least one first wireless device, the feedback condition corresponding to the at least one first wireless device, and any first wireless device selectively feeds back the measurement report related to channel information based on the feedback condition corresponding to the first wireless device. This reduces transmission resources required for feedback. When the method is applied to wireless sensing, message traffic in wireless sensing measurement can be reduced. This helps improve efficiency of wireless sensing application analysis, and implement a wireless sensing function at a low cost.

Figure 11:
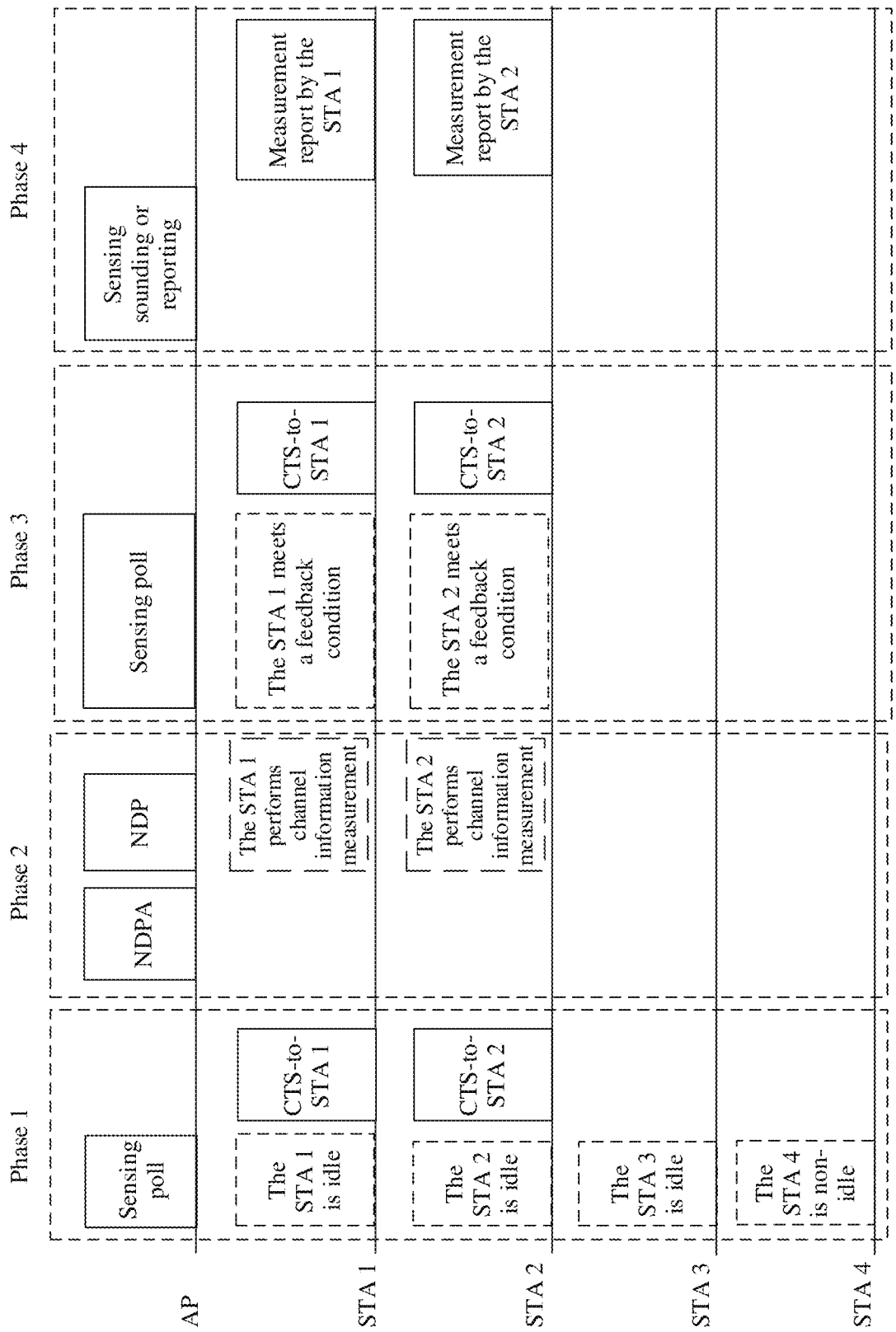
FIG. 11 is a schematic flowchart of transmission between an AP and a STA according to an embodiment.

Referring to FIG. 11, an embodiment further provides a schematic flowchart of transmission between an AP and a STA. For example, a second wireless device is an AP, and a first wireless device is a STA. A process in which one AP interacts with a plurality of STAs to implement wireless sensing measurement and feedback is described. FIG. 11 shows an AP and four STAs in a communication range of the AP. The four STAs are: a STA 1, a STA 2, a STA 3, and a STA 4.

Phase 1: The AP queries whether each STA (the STA 1, the STA 2, the STA 3, and the STA 4) is idle, and schedules the STA. In an optional manner, the AP may send a poll frame or a sensing poll frame to the STA 1, the STA 2, the STA 3, and the STA 4. An idle STA sends a CTS frame for response, and participates in a current round of wireless sensing measurement. Otherwise, the STA does not respond to and does not participate in the current round of wireless sensing measurement. For example, the idle STA 1, STA 2, and STA 3 separately send a CTS frame for response, and the non-idle STA 4 does not respond to.

In phase 2, the AP obtains a TXOP, and sends an NDPA or another similar message to the STA 1, the STA 2, and the STA 3 that send the CTS frame, to notify the STA 1, the STA 2, and the STA 3 to perform channel information measurement. After sending the NDPA, the AP sends an NDP that carries the training symbol. For example, if the AP simultaneously sends NDPs on a plurality of spatial flows, the STA 1, the STA 2, and the STA 3 perform channel information measurement once based on the training symbol in the received NDP. Then, the AP sends the NDPA and the NDP to the STA 1, the STA 2, and the STA 3, and the STA 1, the STA 2, and the STA 3 perform channel information measurement again based on a training symbol in a newly received NDP. By analogy, the STA 1, the STA 2, and the STA 3 may complete channel information measurement for a plurality of times. As an example, FIG. 11 shows only one channel information measurement process, but it does not mean that there is only one channel information measurement process. In addition, it should be noted that the AP may send the NDPA and the NDP twice or more times within one TXOP; or may send the NDPA and the NDP only once within one TXOP, and send the NDPA and the NDP again within a next TXOP. That is, in this embodiment, a time difference between two adjacent times of sending the NDPA in a time sequence is not limited, and may be determined based on an actual requirement.

Figure 12:
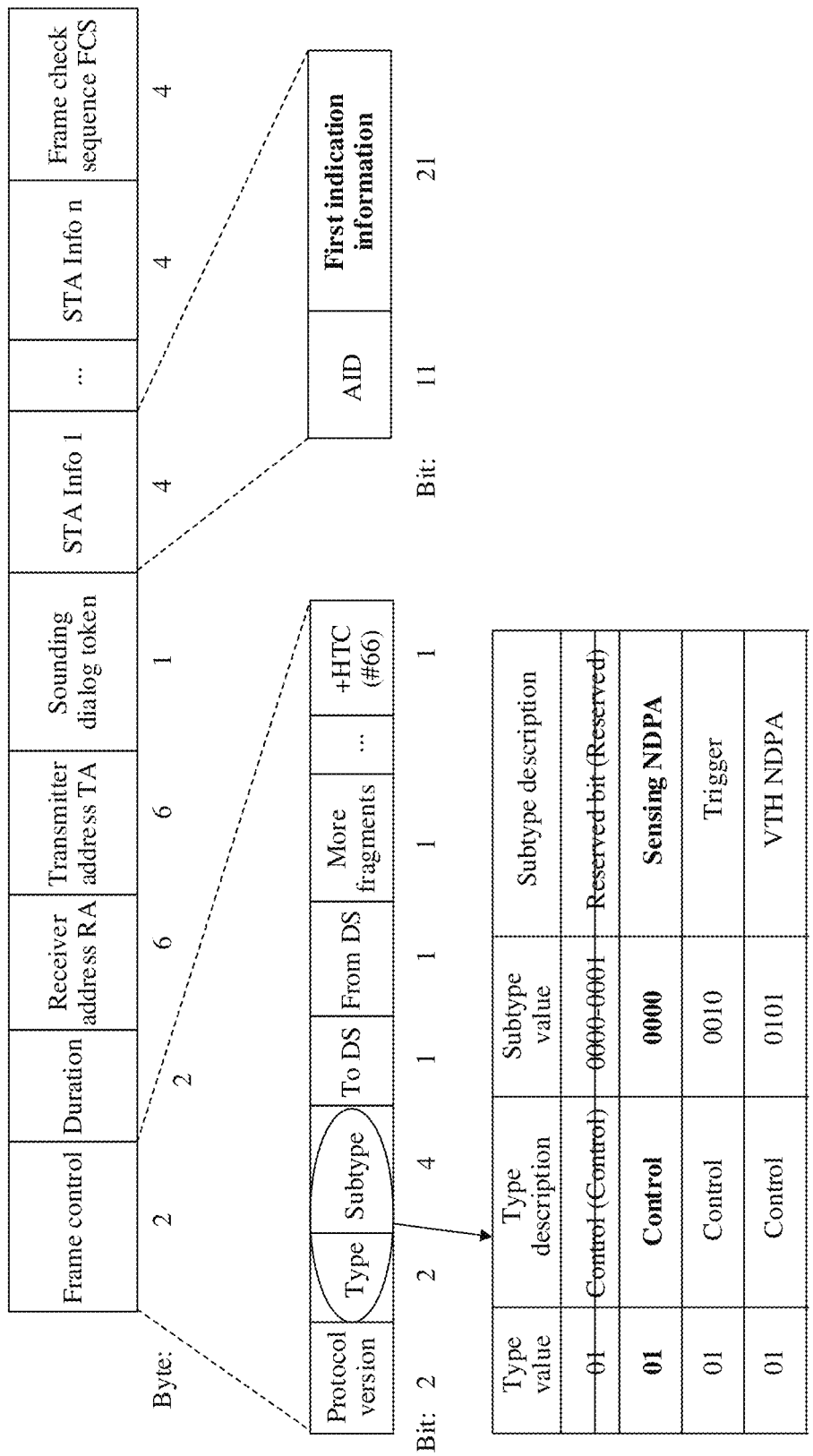
FIG. 12 is a schematic diagram 1 of a structure of an NDPA frame according to an embodiment.

Optionally, the NDPA carries first indication information related to the STA 1, first indication information related to the STA 2, and first indication information related to the STA 3, so that the STA 1, the STA 2, and the STA 3 separately determine, based on the first indication information related to the STA 1, the STA 2, and the STA 3, feedback conditions applicable to the STA 1, the STA 2, and the STA 3. Further, the first indication information may be replaced with another name, for example, a sensing indication or a sensing parameter, provided that they can be used for determining a corresponding feedback condition. This is not limited in this embodiment of this application. In an implementation, the NPDA frame may include a plurality of terminal information (STA Info) fields. Each STA info corresponds to one STA, and each STA info includes an association identifier (AID) of a STA corresponding to the STA info, and first indication information related to the STA corresponding to the STA info. FIG. 12 is a schematic diagram of a structure of an NDPA frame. The NDPA frame includes a frame control field, a duration field, a receiver address (RA) field, a transmitter address (TA) field, a sounding dialog token field, a plurality of station information (STA Info) fields, and an FCS (Frame Check Sequence) field, such as a frame check sequence FCS field. The plurality of station information (STA Info) fields includes STA Info 1 corresponding to the STA 1, STA Info 2 corresponding to the STA 2, STA Info 3 corresponding to the STA 3, and the like. The STA Info 1 is used as an example. The STA Info 1 field occupies 4 bytes (Octets), that is, 32 bits in total. In an optional manner, in the 32 bits, the AID occupies 11 bits, and the first indication information occupies 21 bits.

Optionally, a subtype may be used based on a frame control field in the NDPA frame to indicate that the measured channel information is used for wireless sensing. For example, content included in the frame control field shown in FIG. 12 is as follows: the frame control field occupies 2 bytes in total, that is, 16 bits. In the 16 bits, a protocol version field occupies 2 bits, a type field occupies 2 bits, a subtype field occupies 4 bits, a to DS field occupies 1 bit, a from DS field occupies 1 bit, DS refers to a distributed system, more fragment field occupies 1 bit, +HTC(#66) occupies 1 bit, and HTC refers to high throughput control.

Content of a value indication corresponding to the type and the subtype is shown in FIG. 12. A value of the type is 01, indicating control; a value of the subtype is 0010, indicating trigger, and in this case, the NDPA frame may be used as a trigger frame; and a value of the subtype is 0101, indicating a very high throughput null data packet announcement (VHT NDP Announcement). In addition, based on an originally undefined reserved bit, that is, a row with a type value of 01 and a subtype value of 0000-0001 that is crossed out as shown in FIG. 12, a value 01 of a defined type and a value 0000 of the subtype are added, which indicates that the NDPA frame is a wireless sensing NDPA (Sensing NDP Announcement). This indicates that the measured channel information is used for wireless sensing. Alternatively, the foregoing first indication information may further indicate that the measured channel information is used for wireless sensing. For example, a reserved field in the first indication information indicates that the measured channel information is used for wireless sensing.

In phase 3, the AP queries whether a variation degree of the channel information (for example, the foregoing first channel information variation) meets a feedback condition by comparing currently measured channel information by the STA 1, the STA 2, and the STA 3 with historically measured channel information. In an optional manner, the AP may send a poll (poll) frame or a sensing poll frame to the STA 1, the STA 2, the STA 3, and the STA 4. A STA that meets the feedback condition sends a CTS frame to the AP for response, and a STA that does not meet the feedback condition does not send a CTS frame to the AP. As shown in FIG. 11, the STA 1 and the STA 2 send CTS frames to the AP for response.

In phase 4, the AP sends a feedback indication, for example, a sounding or report frame or a sensing sounding or report frame, to the STA 1 and the STA 2 that send the CTS frames in phase 3. The STA 1 and the STA 2 feed back measurement reports to the AP. The measurement report may be measured channel information, an NDP packet used for determining channel information, a wireless sensing measurement result, or the like. Alternatively, the STA 1 and the STA 2 may actively feed back the measurement reports to the second wireless device, that is, the AP does not need to send the feedback indication.

In this embodiment, a broadcast manner is used in a process of sending a measurement announcement and a measurement packet. After the measurement packet is sent once, a plurality of different STAs may simultaneously perform channel information measurement to cover wireless sensing in a large area. Each STA may independently determine, based on a broadcast measurement packet, whether an action occurs around the STA and whether feedback is required. In an actual environment, an environment is quiet in most cases. Therefore, this manner can greatly reduce channel occupancy caused by sensing a measurement packet in a static environment, reduce interference on other normal Wi-Fi data streams, and reduce energy consumption of a mobile node. In addition, when an action occurs around the STA, the STA may provide feedback in time, to notify the AP that an action occurs. In this case, the system can quickly sense the movement.

The following describes in detail an implementation in which the second wireless device indicates the feedback condition by using the first indication information and how the first wireless device determines whether to perform feedback in different indication manners.

Manner 1: The first indication information includes a first variation threshold, and the feedback condition is that a channel information variation is greater than or equal to the first variation threshold, or the feedback condition is that a channel information variation is less than or equal to the first variation threshold.

Figure 13A:
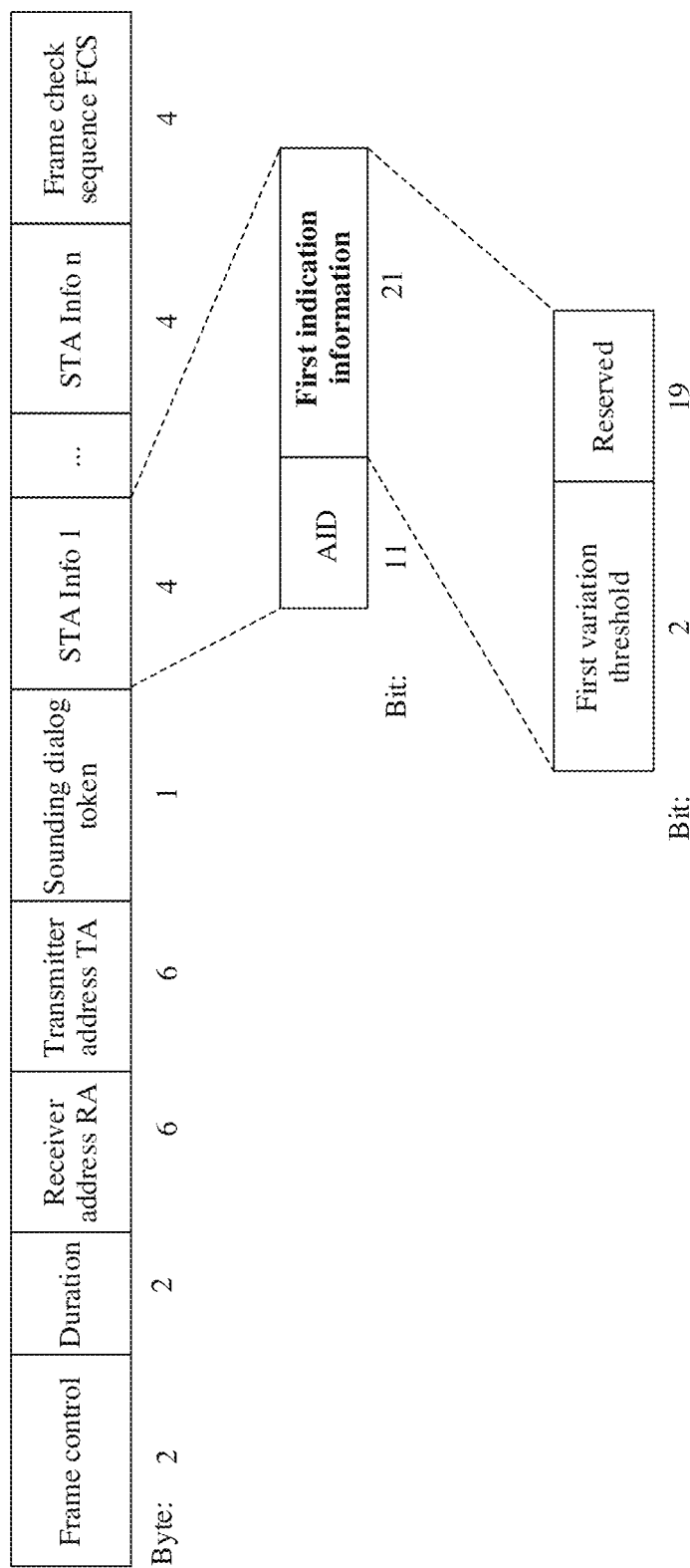
FIG. 13a is a schematic diagram 2 of a structure of an NDPA frame according to an embodiment.

Optionally, if the first message that carries the first indication information is an NDPA, the first wireless device may obtain, from STA Info that is in the NDPA and that corresponds to the NDPA, the first indication information related to the first wireless device, that is, obtain the first variation threshold. As shown in FIG. 13a, content of first indication information (Sensing Indication) in STA Info 1 is included. The first indication information includes 21 bits in total. The first variation threshold occupies 2 bits, and the remaining 19 bits are reserved bits.

Optionally, the feedback condition is related to a channel information variation evaluation algorithm used by the first wireless device. If the first wireless device uses a first channel information variation evaluation algorithm based on a distance (for example, a cosine distance), an entropy value (for example, a cross entropy), or the like, the feedback condition related to the first wireless device is that the channel information variation is greater than or equal to the first variation threshold. When the first channel information variation determined by the first wireless device is greater than or equal to the first variation threshold, the first wireless device may feed back the measurement report to the second wireless device. If the first wireless device uses a second channel information variation evaluation algorithm based on a correlation coefficient, the feedback condition related to the first wireless device is that the channel information variation is less than or equal to the first variation threshold. When the first channel information variation determined by the first wireless device is less than or equal to the first variation threshold, the first wireless device may feed back the measurement report to the second wireless device.

Figure 13B:
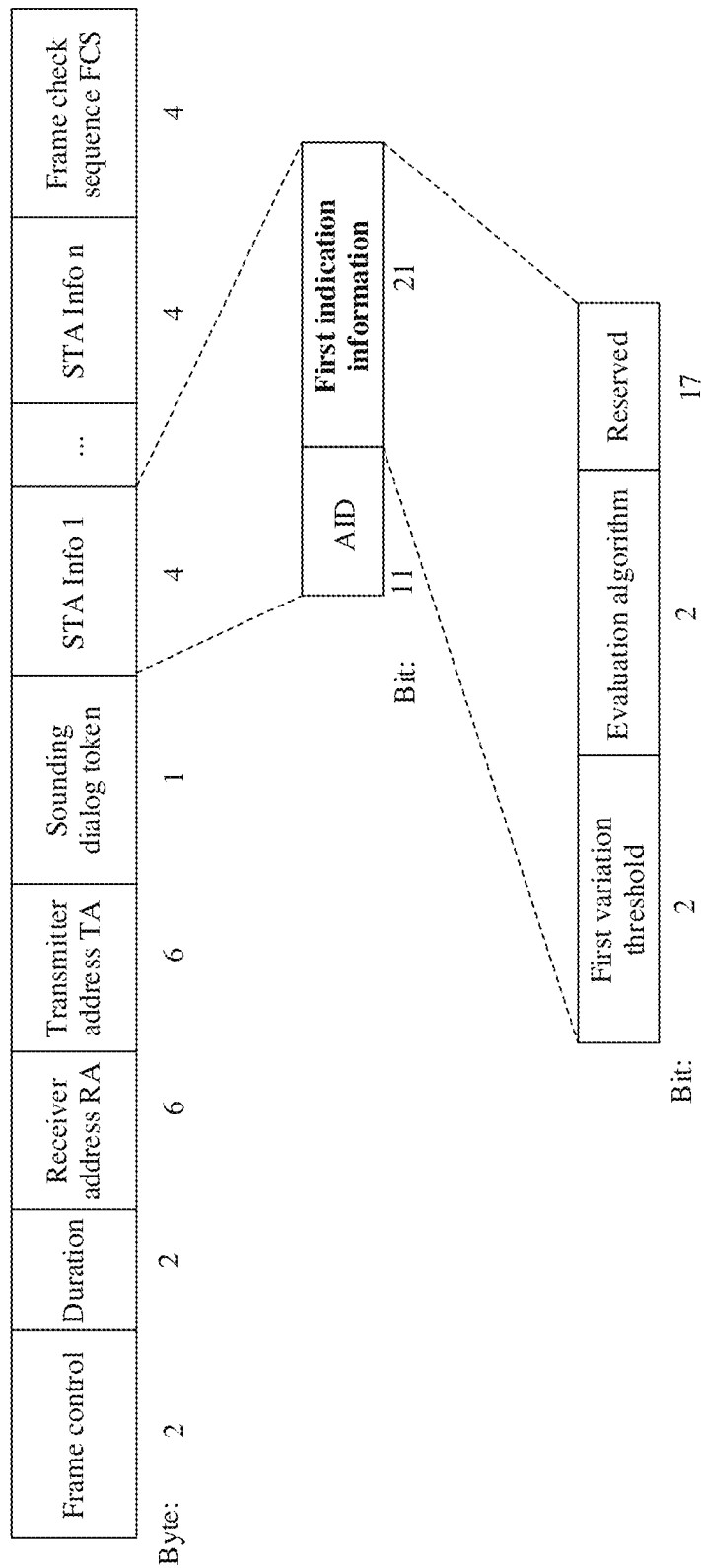
FIG. 13b is a schematic diagram 3 of a structure of an NDPA frame according to an embodiment.

Optionally, in an implementation, the channel information variation evaluation algorithm used by the first wireless device may be a default evaluation algorithm preconfigured by the first wireless device. After obtaining the first variation threshold in the first indication information related to the first wireless device, the first wireless device may determine, based on the preconfigured default evaluation algorithm, whether the feedback condition is that the channel information variation is greater than or equal to the first variation threshold or the channel information variation is less than or equal to the first variation threshold. In another implementation, the channel information variation evaluation algorithm used by the first wireless device may be indicated by the second wireless device. For example, the second wireless device may include a first variation threshold and a first identifier in the first indication information. The first identifier indicates the first channel information variation evaluation algorithm or the second channel information variation evaluation algorithm. The first identifier may also be replaced with another name, for example, an evaluation algorithm. This is not limited in this embodiment. FIG. 13b shows content of first indication information (Sensing Indication) in STA Info 1. The first indication information includes 21 bits in total. A first variation threshold occupies 2 bits, a first identifier occupies 2 bits, and remaining 17 bits are reserved bits. The first identifier may also be replaced with another name, for example, an evaluation algorithm, provided that it can indicate the related channel information variation evaluation algorithm. This is not limited in this embodiment. For example, a value of an evaluation algorithm (that is, the first identifier) field included in the first indication information in the NDAP is shown in Table 1.

TABLE 1

| Evaluation algorithm field | Description (description) |
| --- | --- |
| 0 (corresponding to bit 00) | Time-reversal resonating strength method |
| 1 (corresponding to bit 01) | Mahalanobis distance method |
| 2-3 (corresponding to bit 10 or 11) | Reserved |

Optionally, the foregoing first channel information variation evaluation algorithm includes a Mahalanobis distance (MD) method, and the foregoing second channel information variation evaluation algorithm includes a time-reversal resonating strength (TRSS) method.

The Mahalanobis distance (MD) is a common distance indicator in metric learning, and is a distance based on sample distribution. The Mahalanobis distance corrects a problem of inconsistency and correlation of dimensions in the Euclidean distance and is used for evaluating a similarity between data. The Mahalanobis distance is used for measuring a similarity between two channel impulse responses (CIR). A larger value of the Mahalanobis distance indicates a greater difference between the two CIRs, that is, there is a large variation between the two CIRs. A value range of the Mahalanobis distance is $[0, +\infty)$. Projection space of the Mahalanobis distance may be obtained by performing the following steps: rotating variables based on the principal component, so that the dimensions are independent of each other, and then standardizing the dimensions, so that the dimensions are distributed in a same manner. It can be understood from the principal component analysis that, because the principal component is a direction of an eigenvector, and a variance in each direction is a corresponding eigenvalue. Therefore, the variance needs only to be rotated based on the direction of the eigenvector, and then the variance is scaled by a multiple, where the multiple is equal to the eigenvalue. For a to-be-sensed area, it is assumed that a CIR received by the STA by performing channel information measurement at a moment $t_1$ is $h_1=[h_1[0], h_1[1], \ldots, h_1[L-1]]$, and a CIR received by the STA at a moment $t_2$ is $h_2=[h_2[0], h_2[1], \ldots, h_2[L-1]]$. When the Mahalanobis distance is greater than or equal to a specified threshold, for example, the foregoing first variation threshold, it indicates that there is a large variation between two CIRs, and in this case, channel information update and feedback need to be performed. The Mahalanobis distance between $h_1$ and $h_2$ is calculated according to the following formula, and is denoted as $d(h_1, h_2)$, where $$d(h_1,h_2)=\sqrt{(h_1-h_2)^T \Sigma^{-1}(h_1-h_2)}.$$

$\Sigma=\mathrm{cov}(h_1, h_2)=E[(h_1-E[h_1])(h_2-E[h_2])^T]$ is a covariance matrix, $E[h_1]$ represents an expectation of $h_1$, and a superscript $^T$ represents a transposition of the matrix. The covariance matrix may simultaneously present correlation between different dimensions and a variance in each dimension. An element on the main diagonal is the variance (that is, energy) in each dimension, and another element is a covariance (that is, the correlation) between every two dimensions.

The time-reversal resonating strength method TRRS is a maximum amplitude of a cross-correlation coefficient obtained by convolution of two channel impulse responses (CIR), and is used for measuring a similarity between the two CIRs. A larger value of the TRRS indicates that the two CIRs are more similar, and there is small variation between the two CIRs. A value range of the TRSS is $[0, 1]$.

For a to-be-sensed area, it is assumed that a CIR received by the STA by performing sensing measurement at a moment $t_1$ is $h_1=[h_1[0], h_1[1], \ldots, h_1[L-1]]$, a CIR received by the STA at a moment $t_2$ is $h_2=[h_2[0], h_2[1], \ldots, h_2[L-1]]$, and L represents a length of a CIR sequence. When the TRRS is less than or equal to a specified threshold, for example, the foregoing first variation threshold, it indicates that there is a large variation between the two CIRs, and in this case, channel information update and feedback need to be performed. The TRRS between $h_1$ and $h_2$ is calculated according to the following formula, and is denoted as $\eta(h_1, h_2)$, where $$\eta(h_1, h_2) = \frac{\max_i |(h_1 * g_2)[i]|}{\sqrt{\sum_{i=0}^{L-1} |h_1[i]|^2} \sqrt{\sum_{j=0}^{L-1} |g_2[j]|^2}}.$$

$g_2=[g_2[0], g_2[1], \ldots, g_2[L-1]]$ is obtained after time reversal and conjugate of $h_2$, and $g_2[k]=h^*_2[L-1-k]$, $k=0, 1, \ldots, L-1$, and $h*2$ represent a conjugate of $h_2$.

In this embodiment, the second wireless device indicates, to each first wireless device, a corresponding single variation threshold, and each first wireless device determines, based on the single variation threshold indicated by the second wireless device and according to a channel information variation evaluation algorithm used by the first wireless device, a lower limit or an upper limit of a variation that needs to be met by feedback, to selectively feed back the measurement report related to the channel information. This can reduce transmission resources required for feedback.

Manner 2: The first indication information includes a second variation threshold and a third variation threshold, and the feedback condition is that a channel information variation is greater than or equal to the second variation threshold, and the channel information variation is less than or equal to the third variation threshold. The third variation threshold is greater than the second variation threshold.

Figure 14:
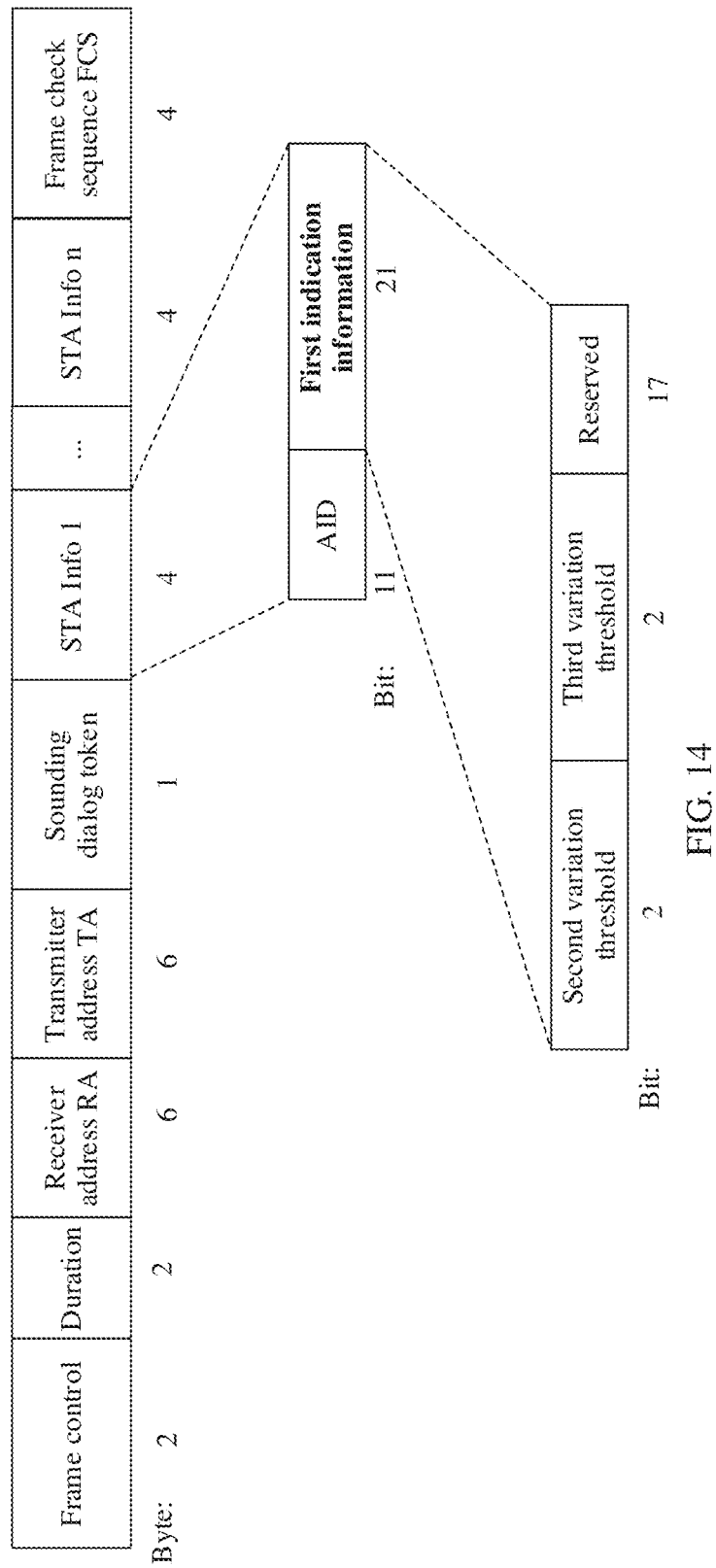
FIG. 14 is a schematic diagram 4 of a structure of an NDPA frame according to an embodiment.

Optionally, if the first message that carries the first indication information is the NDPA, the first wireless device may obtain, from STA Info that is in the NDPA and that corresponds to the NDPA, the first indication information related to the first wireless device, that is, obtain the second variation threshold and the third variation threshold. In this case, the first channel information variation determined by the first wireless device is within a value range including the second variation threshold and the third variation threshold, and the first wireless device may feed back the measurement report to the second wireless device. FIG. 14 shows content of first indication information (Sensing Indication) in STA Info 1. The first indication information includes 21 bits in total. A second variation threshold (Variation Threshold-2) occupies 2 bits, a third variation threshold (Variation Threshold-3) occupies 2 bits, and the remaining 17 bits are reserved bits.

In this embodiment, the second wireless device indicates, to each first wireless device, a corresponding double variation threshold, and each first wireless device may determine a variation value range that needs to be met by feedback, to selectively feed back the measurement report related to the channel information. This can reduce transmission resources required for feedback.

Manner 3: The first indication information includes a first sensitivity level, and the first sensitivity level is used for determining a feedback condition.

In an optional manner, the first sensitivity level is related to a first variation threshold, and the feedback condition is that a channel information variation is greater than or equal to the first variation threshold, or the feedback condition is that a channel information variation is less than or equal to the first variation threshold.

Optionally, an association relationship between a sensitivity level and a single variation threshold may be predefined. In this case, after obtaining the first sensitivity level from the first indication information, the first wireless device first determines the first variation threshold related to the first sensitivity level. Then, with reference to the foregoing manner 1, when the second wireless device does not indicate a channel information variation evaluation algorithm, the first wireless device may determine, according to a channel information variation evaluation algorithm preconfigured by the first wireless device, whether the feedback condition is that the channel information variation is greater than or equal to the first variation threshold or the channel information variation is less than or equal to the first variation threshold. Alternatively, when the second wireless device indicates the channel information variation evaluation algorithm, the first wireless device determines, based on the channel information variation evaluation algorithm indicated by the second wireless device, whether the feedback condition is that the channel information variation is greater than or equal to the first variation threshold or the channel information variation is less than or equal to the first variation threshold.

Optionally, a value range (also referred to as an interval) of the variation threshold used for measuring a variation degree of the channel information may be predefined, for example, [0, 1]. The value range is divided into q subintervals, and each subinterval corresponds to a sensitivity level. For example, refer to the following implementation: The range of the [0, 1] is divided into the q subintervals $[I_{start\_j}, I_{end\_j})$, and the subintervals correspond to different sensing sensitivities. $I_{start\_j}$ and $I_{end\_j}$ are respectively a start value and an end value of the $j^{th}$ subinterval. In this case, after obtaining the first sensitivity level from the first indication information, the first wireless device first determines a subinterval corresponding to the first sensitivity level, and then determines the first variation threshold based on the subinterval. Then, with reference to the foregoing manner 1, when the second wireless device does not indicate a channel information variation evaluation algorithm, the first wireless device may determine, according to a channel information variation evaluation algorithm preconfigured by the first wireless device, whether the feedback condition is that the channel information variation is greater than or equal to the first variation threshold or the channel information variation is less than or equal to the first variation threshold. Alternatively, when the second wireless device indicates the channel information variation evaluation algorithm, the first wireless device determines, based on the channel information variation evaluation algorithm indicated by the second wireless device, whether the feedback condition is that the channel information variation is greater than or equal to the first variation threshold or the channel information variation is less than or equal to the first variation threshold.

For a manner in which the first wireless device determines the first variation threshold based on the subinterval, refer to the following implementation: The first wireless device sets, based on a preset algorithm (also referred to as a rule), the first variation threshold in the subinterval $[I_{start\_j}, I_{end\_j})$ corresponding to the first sensitivity level. For example, the threshold is set to $\Delta_{Var\_th}=(I_{start\_j}+I_{end\_j})/2$ by using an interval average method. In addition, a specific value of the threshold may be set by using another method based on a specific scenario requirement. This is not limited in this embodiment. Optionally, the foregoing preset algorithm may be predefined, or may be indicated by the second wireless device by using the first indication information. For example, on the basis that the first indication information includes the first sensitivity level, the second wireless device may further include an identifier that indicates a threshold setting algorithm.

Figure 15A:
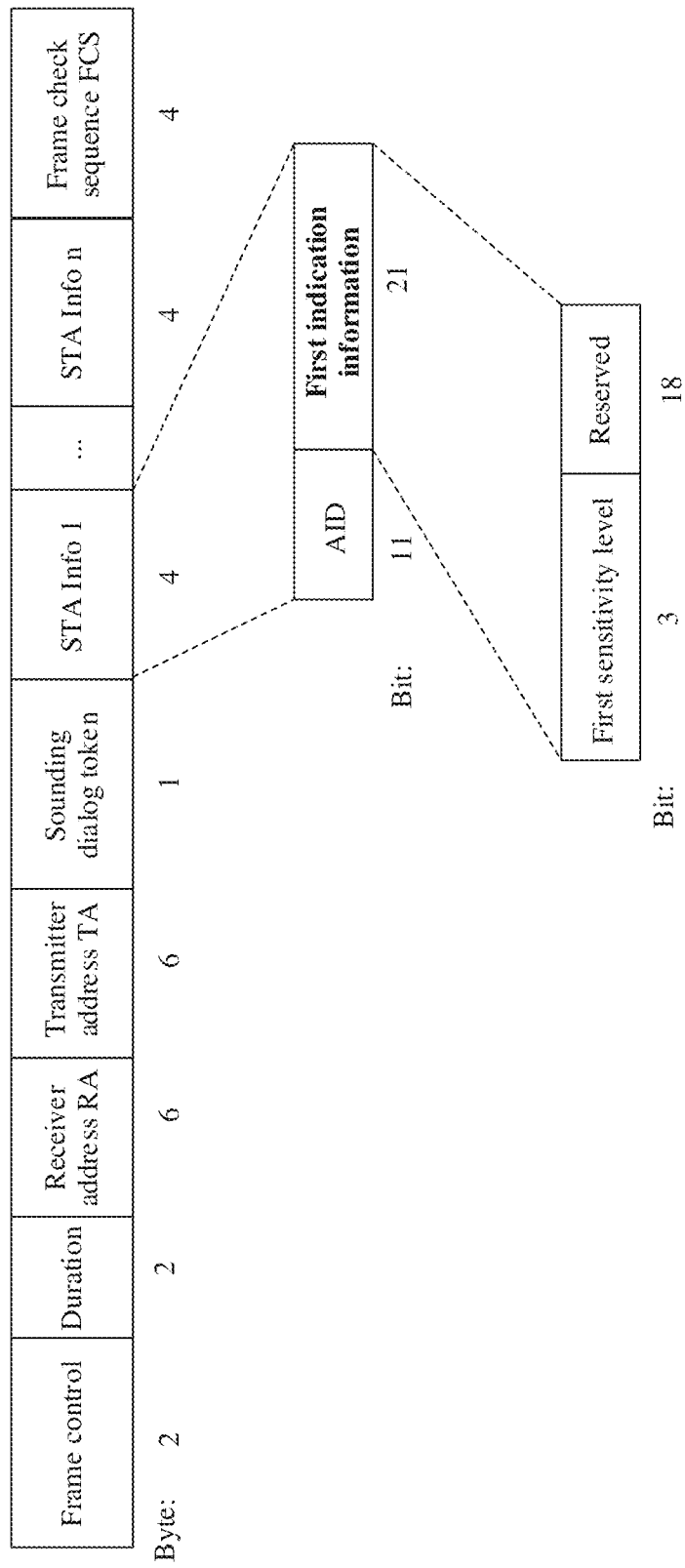
FIG. 15a is a schematic diagram 5 of a structure of an NDPA frame according to an embodiment.

For example, if the first message that carries the first indication information is an NDPA, the first wireless device may obtain, from STA Info that is in the NDPA and that corresponds to the NDPA, the first indication information related to the first wireless device, that is, obtain the first sensitivity level. Optionally, m+n bits in the first indication information may indicate the first sensitivity level, and the quantity q of the foregoing subintervals is also determined based on m+n: the first m bits may indicate value_m integers of value_m∈[0, $2^m$−1], and the last n bits indicate $2^n$ integers. Therefore, the range of [0, 1] may be divided into interval_num=(1+value_m)×$2^n$ subintervals in total. When value_m=$2^m$−1, a quantity of subintervals divided by using this (m+n) bits is the largest, and in this case, a total of interval_num=$2^m$+n subintervals are divided. Value_m is a value indicated by m bits, and interval_num is a total quantity of subintervals obtained through division. Interval_num may be set based on different sensing scenario requirements. A larger quantity of subintervals indicates a finer classification of sensing sensitivity levels. In this embodiment, m+n=3 is used. FIG. 15a shows content of first indication information (Sensing Indication) in STA Info 1. The first indication information includes 21 bits in total. A first sensitivity level (Sensitivity Level) occupies 3 bits, and remaining 18 bits are reserved (reserved) bits.

It is assumed that m=2 and n=1, [0, 1] is divided into 22 subintervals, and numbers from 0 to 3 indicate these intervals and indicate sensing sensitivity. A value range of a first sensitivity level field is shown in Table 2 below. The numbers from 0 to 3 indicate that the sensitivity decreases gradually in ascending order.

TABLE 2

| First sensitivity level field | Description |
| --- | --- |
| 0 | Indicates a high sensitivity and no threshold is set, where once CSI measurement is performed, a STA feeds back CSI to an AP. |
| 1 | Indicates a relatively high sensitivity, and a threshold that can be easily reached is set. |
| 2 | Indicates a medium sensitivity, and a medium threshold is set. |
| 3 | Indicates a low sensitivity, and a threshold that is difficult to reach is set. |
| 4 to 7 | Indicates reserved bit, and the sensitivity level can be set to other thresholds. |

Figure 15B:
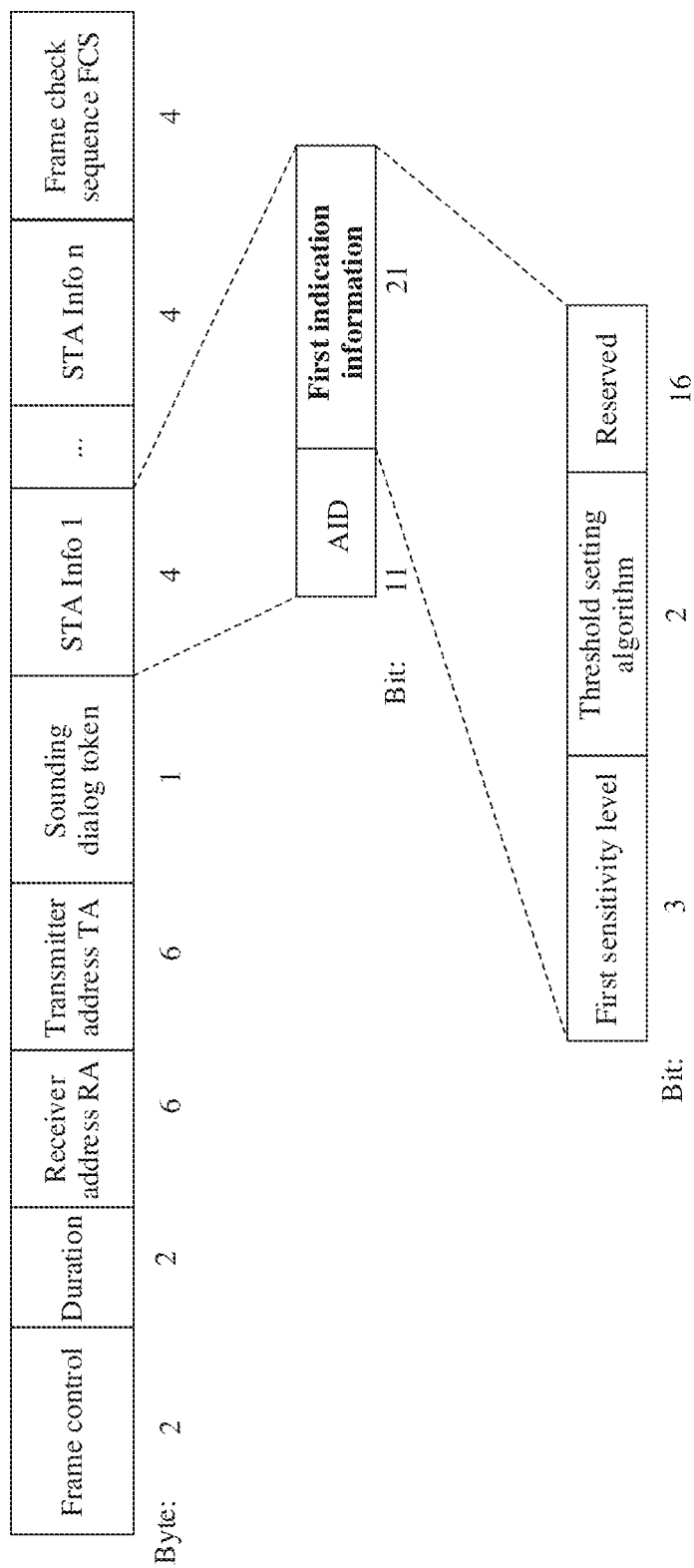
FIG. 15b is a schematic diagram 6 of a structure of an NDPA frame according to an embodiment.

Further, FIG. 15b shows content of first indication information (Sensing Indication) in STA Info 1. The first indication information includes 21 bits in total. A first sensitivity level occupies 3 bits, an identifier that indicates a threshold setting algorithm, also referred to as a threshold setting algorithm field occupies 2 bits, and remaining 16 bits are reserved bits. A value range of the threshold setting algorithm field is shown in Table 3 below.

TABLE 3

| Threshold setting algorithm field | Description |
| --- | --- |
| 0 | Indicates that a threshold is set by using an interval average method. |
| 1 to 3 | Indicates reserved. |

In another optional manner, the first sensitivity level is related to a second variation threshold and a third variation threshold, and the feedback condition is that a channel information variation is greater than or equal to the second variation threshold, and the channel information variation is less than or equal to the third variation threshold.

Optionally, an association relationship between the sensitivity level and a double variation threshold may be predefined. The double variation threshold indicates a variation value range, and a channel information variation that needs to be measured and determined by a feedback measurement report is within the variation value range. After obtaining the first sensitivity level from the first indication information, the first wireless device first determines a double variation threshold related to the first sensitivity level, including a second variation threshold and a third variation threshold. Then, with reference to the foregoing manner 2, when the determined first channel information variation falls within a variation value range including the second variation threshold and the third variation threshold, the first wireless device may feed back the measurement report to the second wireless device.

Optionally, a value range (also referred to as an interval) of the variation threshold used for measuring a variation degree of the channel information may be predefined, for example, [0, 1]. The value range is divided into q subintervals, and each subinterval corresponds to a sensitivity level. For example, refer to the following implementation: The range of the [0, 1] is divided into the q subintervals [$I_{start\_j}$, $I_{end\_j}$), and the subintervals correspond to different sensing sensitivities. $I_{start\_j}$ and $I_{end\_j}$ are respectively a start value and an end value of the $j^{th}$ subinterval. After obtaining the first sensitivity level from the first indication information, the first wireless device first determines a subinterval corresponding to the first sensitivity level, and then determines the second variation threshold and the third variation threshold based on the subinterval. Then, with reference to the foregoing manner 2, when the determined first channel information variation falls within a value range including the second variation threshold and the third variation threshold, the first wireless device may feed back the measurement report to the second wireless device.

For a manner in which the first wireless device determines the second variation threshold and the third variation threshold based on the subinterval, refer to the following implementation: The first wireless device sets, based on a preset algorithm (also referred to as a rule), the second variation threshold and the third variation threshold in the subinterval [$I_{start\_j}$, $I_{end\_j}$) corresponding to the first sensitivity level. For example, $\Delta_{Var\_th}=3/4\times I_{start\_j}+1/4\times I_{end\_j}$ is set as the second variation threshold in the interval close to $I_{start\_j}$ by using a quartile method, and $\Delta_{Var\_th}=1/4\times I_{start\_j}+3/4\times I_{end\_j}$ is set as the third variation threshold in the interval close to $I_{end\_j}$. In addition, a specific value of the threshold may be set by using another method based on a specific scenario requirement. This is not limited in this embodiment. Optionally, the foregoing preset algorithm may be predefined, or may be indicated by the second wireless device by using the first indication information. For example, on the basis that the first indication information includes the first sensitivity level, the second wireless device may further include an identifier that indicates a threshold setting algorithm.

For example, if the first message that carries the first indication information is an NDPA, the first wireless device may obtain, from STA Info that is in the NDPA and that corresponds to the NDPA, the first indication information related to the first wireless device, that is, obtain the first sensitivity level. FIG. 15a shows content of first indication information (Sensing Indication) in STA Info 1. The first indication information includes 21 bits in total. A first sensitivity level occupies 3 bits, and the remaining 18 bits are reserved bits. For a specific value range of the first sensitivity level, refer to manner 2. Details are not described in this embodiment again. Similarly, as shown in FIG. 15b, in addition to the first sensitivity level, the first indication information in the STA Info 1 may further include an identifier field of a threshold setting algorithm. The algorithm used for setting the second variation threshold and the third variation threshold may be defined based on an actual situation. This is not limited in this embodiment.

In this embodiment, the sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

Manner 4: The first indication information includes a sensitivity level range, the sensitivity level range includes at least one sensitivity level, and a variation threshold related to the at least one sensitivity level is used for determining the feedback condition.

Optionally, an association relationship between the sensitivity level and a single variation threshold may be predefined. A variation threshold related to each sensitivity level in the at least one sensitivity level may be a single variation threshold used for measuring a channel information variation in the foregoing manner 1. Therefore, after obtaining the sensitivity level range from the first indication information, the first wireless device first determines, within the sensitivity level range, the first sensitivity level corresponding to the first wireless device. For example, the first wireless device may determine, based on information such as a current environment in which the first wireless device is located, signal received strength, and/or a detected target that needs to be sensed, the first sensitivity level corresponding to the first wireless device. Then, the first wireless device predefines the association relationship between the first sensitivity level and the single variation threshold, to determine the first variation threshold related to the first sensitivity level. Further, the first wireless device may determine the feedback condition based on the first variation threshold in implementation 1. Details are not described in this embodiment.

Optionally, an association relationship between the sensitivity level and the double variation threshold may be predefined, and the at least one sensitivity level may alternatively be a double variation threshold that indicates a value range of a channel information variation in manner 2. After obtaining the sensitivity level range from the first indication information, the first wireless device first determines, within the sensitivity level range, the first sensitivity level corresponding to the first wireless device. For example, the first wireless device may determine, based on information such as a current environment in which the first wireless device is located, signal received strength, and/or a detected target that needs to be sensed, the first sensitivity level corresponding to the first wireless device. Then, the first wireless device predefines the association relationship between the first sensitivity level and the double variation threshold, and determines the second variation threshold and the third variation threshold that are related to the first sensitivity level. Further, the first wireless device may determine the feedback condition based on the second variation threshold and the third variation threshold in implementation 2. Details are not described in this embodiment again.

Figure 16:
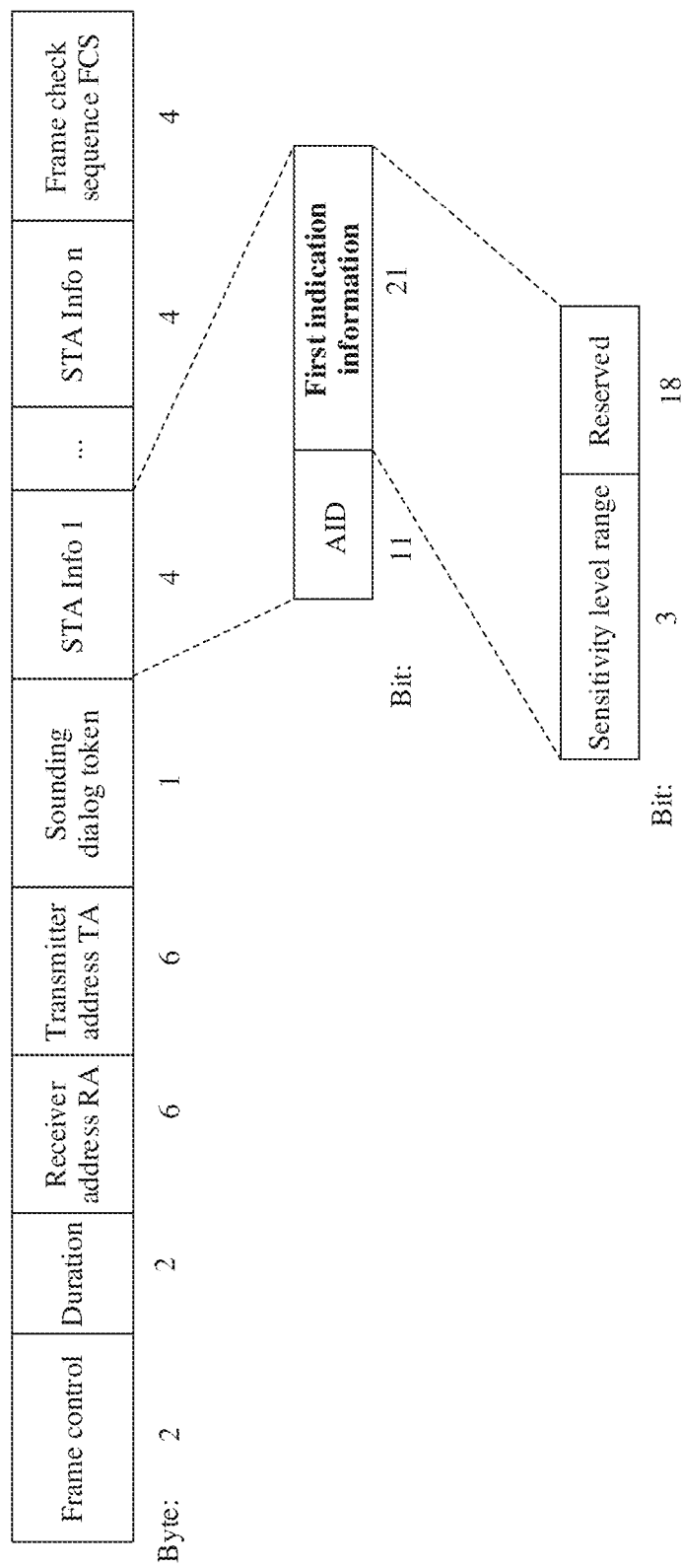
FIG. 16 is a schematic diagram 7 of a structure of an NDPA frame according to an embodiment.

For example, if the first message that carries the first indication information is an NDPA, the first wireless device may obtain, from STA Info that is in the NDPA and that corresponds to the NDPA, the first indication information related to the first wireless device, that is, obtain the first sensitivity level. FIG. 16 shows content of first indication information (Sensing Indication) in STA Info 1. The first indication information includes 21 bits in total. A sensitivity level range occupies 3 bits, and remaining 18 bits are reserved bits. For example, refer to the sensitivity level classification shown in Table 2. A value of the sensitivity level range field in the NDPA may be 3. It indicates that the sensitivity level range includes the sensitivity level indicated by the currently defined numbers 0 to 3.

In this embodiment, the first wireless device dynamically determines a sensitivity level of the first wireless device based on the sensitivity level range indicated by the second wireless device and with reference to a current situation of the first wireless device, for example, signal received strength, an environment in which the first wireless device is located, and a surrounding detectable target. Further, the feedback condition applicable to the first wireless device is flexibly obtained, and is applicable to wireless sensing scenarios of different sensitivities.

Further, in any one of manner 1 to manner 4, the first indication information further includes a second identifier that indicates an interval mapping algorithm, and the determining a first channel information variation based on currently measured channel information and historically measured channel information may be implemented with reference to the following manner: comparing the currently measured channel information with the historically measured channel information to obtain a second channel information variation; and processing the second channel information variation based on the interval mapping algorithm, to obtain the first channel information variation. The first channel information variation is in a first interval, and the first interval includes the first variation threshold, or the first interval includes the second variation threshold and the third variation threshold. The interval mapping algorithm is indicated, so that the channel information variation determined by each first wireless device through measurement and the related variation threshold are in a same interval. This facilitates comparison between the channel information variation and the related variation threshold, and improves accuracy of selective feedback.

Optionally, the interval mapping algorithm may be implemented by using a mapping algorithm of a normalized interval [0, 1]. A required channel information variation evaluation algorithm is selected based on a type of a sensed service, such as gesture recognition, intrusion detection, fall detection, and respiratory heartbeat detection, and a calculation result is mapped to the range of [0, 1]. For example, for each measurement, a normalized (Normalization) mapping method mapping_value=(original_value−min_value)/(max_value−min_value) may be used. Mapping_value is a value obtained after being mapped to the range of [0, 1], original_value is a variation degree of channel information evaluated by using an algorithm during current measurement, min_value is a minimum value of a variation degree of channel information evaluated by using an algorithm within a period of time, and max_value is a maximum value of a variation degree of channel information evaluated by using an algorithm within a period of time.

If the first message that carries the first indication information is an NDPA, the first wireless device may obtain, from STA Info that is in the NDPA and that corresponds to the NDPA, the first indication information related to the first wireless device, and the first indication information includes the second identifier. The second identifier may also be replaced with another name, for example, a mapping type, provided that it can indicate a related interval mapping algorithm. This is not limited in this embodiment. The mapping type occupies two bits in the first indication information, and a value of the mapping type is shown in Table 4 below.

TABLE 4

| Mapping type field | Description |
| --- | --- |
| 0 | Normalized mapping |
| 1 to 3 | Reserved bit |

Figure 17:
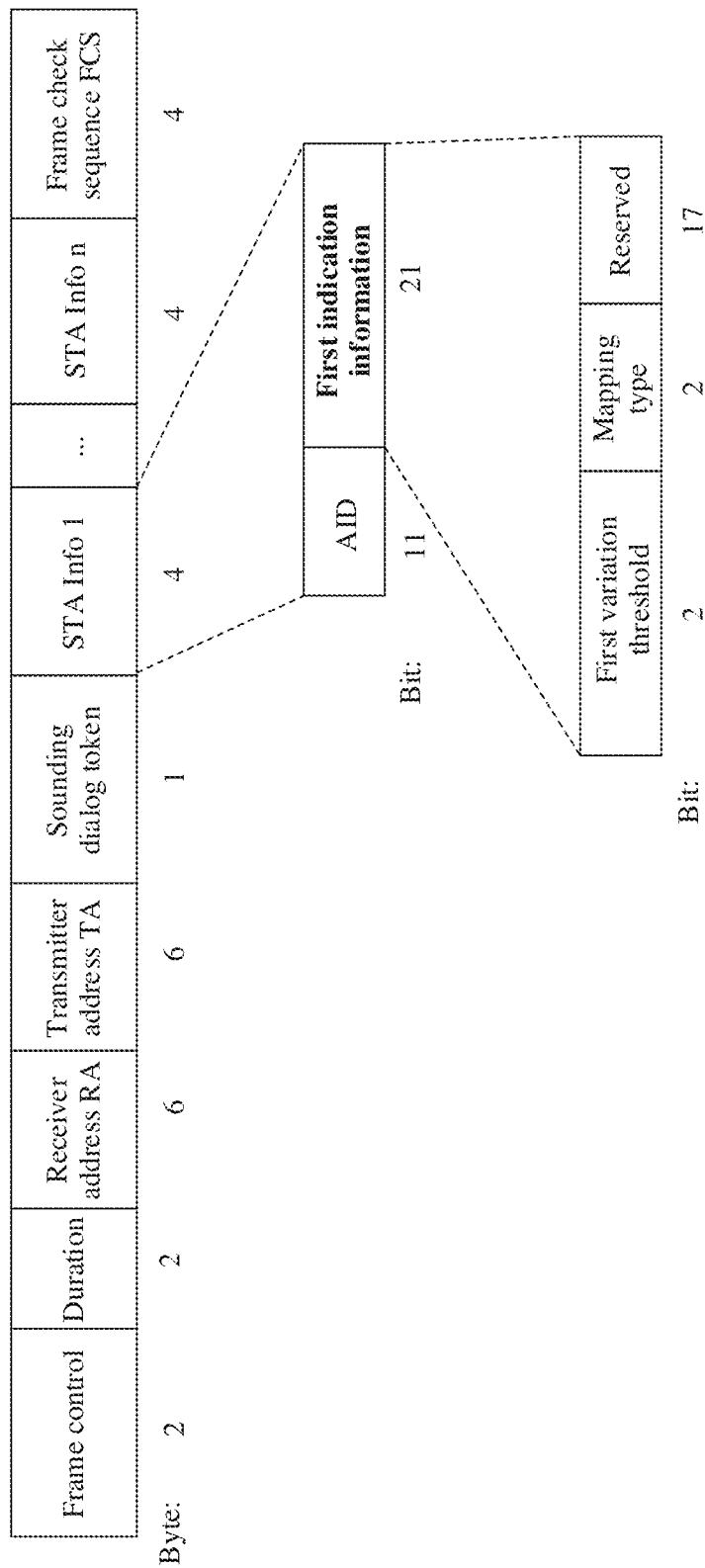
FIG. 17 is a schematic diagram 8 of a structure of an NDPA frame according to an embodiment.

It may be understood that the 2-bit mapping type field in this embodiment may be appended to the first indication information in FIG. 13*a*, FIG. 13*b*, FIG. 14, FIG. 15*a*, FIG. 15*b*, or FIG. 16, and 2 bits are correspondingly reduced from the reserved field in the first indication information when the 2-bit mapping type field is appended. For example, as shown in FIG. 17, the first indication information includes a first variation threshold occupying 2 bits, a mapping type field occupying 2 bits, and a reserved field occupying 17 bits.

Figure 18:
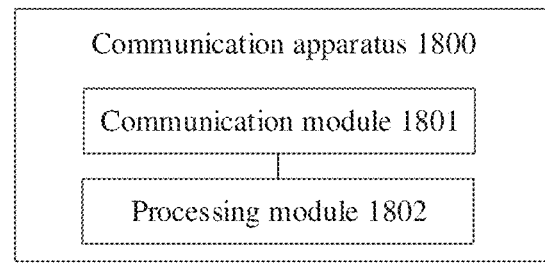
FIG. 18 is a block diagram of a structure of a communication apparatus according to an embodiment.

Based on a same concept, as shown in FIG. 18, an embodiment provides a communication apparatus 1800. The apparatus 1800 includes a communication module 1801 and a processing module 1802. The communication apparatus 1800 may be a first wireless device, or may be an apparatus that is applied to a first wireless device and that can support the first wireless device in performing a channel information feedback method. Alternatively, the communication apparatus 1800 may be a second wireless device, or may be an apparatus that is applied to a second wireless device and that can support the second wireless device in performing a channel information feedback method.

The following describes in detail an implementation in which the apparatus 1800 is applied to a first wireless device.

The communication module 1801 is configured to receive a first message from a second wireless device, where the first message notifies channel information measurement, the first message carries first indication information related to the first wireless device, and the first indication information indicates a feedback condition.

The processing module 1802 is configured to perform channel information measurement based on the first message.

The processing module 1802 is further configured to determine a first channel information variation based on currently measured channel information and historically measured channel information.

The communication module 1801 is further configured to feed back a measurement report to the second wireless device when the first channel information variation meets the feedback condition.

In this embodiment, the first wireless device can selectively feed back, based on the feedback condition indicated by the second wireless device to the first wireless device, the measurement report related to channel information. This reduces transmission resources required for feedback. When the method is applied to wireless sensing, message traffic in wireless sensing measurement can be reduced. This helps improve efficiency of wireless sensing application analysis, and implement a wireless sensing function at a low cost.

In an optional implementation, the first indication information includes a first variation threshold, and the feedback condition is that a channel information variation is greater than or equal to the first variation threshold, or the feedback condition is that a channel information variation is less than or equal to the first variation threshold. The first wireless device determines, based on a single variation threshold indicated by the second wireless device and according to a channel information variation evaluation algorithm used by the first wireless device, a lower limit or an upper limit of a variation that needs to be met by feedback, to selectively feed back the measurement report related to the channel information. This can reduce transmission resources required for feedback.

In an optional implementation, the first indication information includes a second variation threshold and a third variation threshold, and the feedback condition is that a channel information variation is greater than or equal to the second variation threshold, and the channel information variation is less than or equal to the third variation threshold. The first wireless device determines, based on a double variation threshold indicated by the second wireless device, a variation value range that needs to be met by feedback, to selectively feed back the measurement report related to the channel information. This can reduce transmission resources required for feedback.

In an optional implementation, the first indication information includes a first sensitivity level, the first sensitivity level is related to a first variation threshold, and the feedback condition is that a channel information variation is greater than or equal to the first variation threshold, or the feedback condition is that a channel information variation is less than or equal to the first variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a first sensitivity level, the first sensitivity level is related to a second variation threshold and a third variation threshold, and the feedback condition is that a channel information variation is greater than or equal to the second variation threshold, and the channel information variation is less than or equal to the third variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a sensitivity level range, the sensitivity level range includes at least one sensitivity level, and a variation threshold related to the at least one sensitivity level is used for determining the feedback condition. The first wireless device dynamically determines a sensitivity level of the first wireless device based on the sensitivity level range indicated by the second wireless device and with reference to a current situation of the first wireless device, for example, signal received strength, an environment in which the first wireless device is located, and a surrounding detectable target. Further, the feedback condition applicable to the first wireless device is flexibly obtained, and is applicable to wireless sensing scenarios of different sensitivities.

In an optional implementation, the first indication information further includes a first identifier, the first identifier indicates a first channel information variation evaluation algorithm, and the feedback condition is that a channel information variation is greater than or equal to the first variation threshold; or the first identifier indicates a second channel information variation evaluation algorithm, and the feedback condition is that a channel information variation is less than or equal to the first variation threshold. The feedback condition applicable to the first wireless device is indirectly indicated by indicating the first variation threshold and the channel information variation evaluation algorithm to the first wireless device.

In an optional implementation, the first channel information variation evaluation algorithm includes a Mahalanobis distance method, and the second channel information variation evaluation algorithm includes a time-reversal resonating strength method.

In an optional implementation, the first indication information further includes a second identifier that indicates an interval mapping algorithm, and the processing module 1802 is further configured to: compare the currently measured channel information with the historically measured channel information to obtain a second channel information variation; and process the second channel information variation based on the interval mapping algorithm, to obtain the first channel information variation. The first channel information variation is in a first interval, and the first interval includes the first variation threshold, or the first interval includes the second variation threshold and the third variation threshold. The interval mapping algorithm is indicated, so that the channel information variation determined by the first wireless device through measurement and the related variation threshold are in a same interval. This facilitates comparison between the channel information variation and the related variation threshold, and improves accuracy of selective feedback.

In an optional implementation, the communication module 1801 is configured to receive the first message from the second wireless device at least twice. The communication module 1801 is further configured to: for the receiving the first message from the second wireless device at any one of the at least twice, obtain a measurement packet from the second wireless device within first duration after the first message is received, where the measurement packet includes a training symbol; and the processing module 1802 is further configured to perform channel information measurement once based on the training symbol in the measurement packet.

In an optional implementation, the first indication information further includes a configuration period of a measurement packet, and the measurement packet includes a training symbol; and the processing module 1802 is further configured to: obtain, within second duration, the measurement packet from the second wireless device once at an interval of the configuration period; and perform channel information measurement once at an interval of the configuration period based on a newly obtained training symbol in the measurement packet. The second wireless device indicates the configuration period of the measurement packet, and needs to initially send the first message only once within a specific valid time (for example, the second duration). This can reduce signaling overheads and transmission resources.

In an optional implementation, the measurement packet includes an NDP, and the first message includes an NDPA.

In an optional implementation, the first message further carries second indication information, and the second indication information indicates that the measured channel information is used for wireless sensing. The method is applied to wireless sensing. The range that needs to be met by feedback is set for the channel information variation determined by measurement. The first wireless device selectively feeds back the measurement report related to the channel information, to reduce message traffic in wireless sensing measurement. The second wireless device can also quickly learn a status of a detectable target around the first wireless device. This helps improve efficiency of wireless sensing application analysis, and implement a wireless sensing function at a low cost.

The following describes in detail an implementation in which the apparatus 1800 is applied to a second wireless device.

The processing module 1802 is configured to determine at least one first wireless device; the processing module 1802 is further configured to determine first indication information related to the at least one first wireless device, where the first indication information indicates a feedback condition; the communication module 1801 is configured to send a first message to the at least one first wireless device, where the first message notifies channel information measurement, and the first message carries first indication information related to each first wireless device; and the communication module 1801 is further configured to receive a measurement report from the first wireless device when a channel information variation measured by the first wireless device meets the feedback condition.

In this embodiment, the second wireless device indicates, to the at least one first wireless device, the feedback condition corresponding to the at least one first wireless device, and any first wireless device selectively feeds back the measurement report related to channel information based on the feedback condition corresponding to the first wireless device. This reduces transmission resources required for feedback. When the method is applied to wireless sensing, message traffic in wireless sensing measurement can be reduced. This helps improve efficiency of wireless sensing application analysis, and implement a wireless sensing function at a low cost.

In an optional implementation, the first indication information includes a first variation threshold, and the feedback condition is that a channel information variation is greater than or equal to the first variation threshold, or the feedback condition is that a channel information variation is less than or equal to the first variation threshold. A single variation threshold corresponding to each first wireless device is separately indicated to each first wireless device, and any first wireless device may determine, according to a channel information variation evaluation algorithm used by the first wireless device, a lower limit or an upper limit of a variation that needs to be met by feedback of the first wireless device, to selectively feed back the measurement report related to the channel information. This can reduce transmission resources required for feedback.

In an optional implementation, the first indication information includes a second variation threshold and a third variation threshold, and the feedback condition is that a channel information variation is greater than or equal to the second variation threshold, and the channel information variation is less than or equal to the third variation threshold. A double variation threshold corresponding to each first wireless device is separately indicated to each first wireless device, and any first wireless device may determine a variation value range that needs to be met by feedback of the first wireless device, to selectively feed back the measurement report related to the channel information. This can reduce transmission resources required for feedback.

In an optional implementation, the first indication information includes a first sensitivity level, the first sensitivity level is related to a first variation threshold, and the feedback condition is that a channel information variation is greater than or equal to the first variation threshold, or the feedback condition is that a channel information variation is less than or equal to the first variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a first sensitivity level, the first sensitivity level is related to a second variation threshold and a third variation threshold, and the feedback condition is that a channel information variation is greater than or equal to the second variation threshold, and the channel information variation is less than or equal to the third variation threshold. The sensitivity level is set to be related to the variation threshold. The second wireless device dynamically configures a current sensitivity level and a related variation threshold for the first wireless device by indicating a sensitivity level. The feedback condition configured for the first wireless device is more flexible and variable, and is applicable to wireless sensing scenarios of different sensitivities.

In an optional implementation, the first indication information includes a sensitivity level range, the sensitivity level range includes at least one sensitivity level, and a variation threshold related to the at least one sensitivity level is used for determining the feedback condition. Any first wireless device may dynamically determine a sensitivity level of the first wireless device by indicating the sensitivity level range and with reference to a current situation of the first wireless device, for example, signal received strength, an environment in which the first wireless device is located, and a surrounding detectable target. Further, the feedback condition applicable to the first wireless device is flexibly obtained, and is applicable to wireless sensing scenarios of different sensitivities.

In an optional implementation, the first indication information further includes a first identifier, the first identifier indicates a first channel information variation evaluation algorithm, and the feedback condition is that a channel information variation is greater than or equal to the first variation threshold; or the first identifier indicates a second channel information variation evaluation algorithm, and the feedback condition is that a channel information variation is less than or equal to the first variation threshold. The feedback condition applicable to each first wireless device is indirectly indicated by indicating the first variation threshold and the channel information variation evaluation algorithm to each first wireless device.

In an optional implementation, the first channel information variation evaluation algorithm includes a Mahalanobis distance method, and the second channel information variation evaluation algorithm includes a time-reversal resonating strength method.

In an optional implementation, the first indication information further includes a second identifier that indicates an interval mapping algorithm. The interval mapping algorithm is indicated, so that the channel information variation determined by each first wireless device through measurement and the related variation threshold are in a same interval. This facilitates comparison between the channel information variation and the related variation threshold, and improves accuracy of selective feedback.

In an optional implementation, the communication module 1801 is configured to send the first message to the at least one first wireless device at least twice. The communication module 1801 is further configured to: for the sending the first message at any one of the at least twice, send a measurement packet within first duration after the first message is sent, where the measurement packet includes a training symbol, and the first duration is a time difference between two adjacent times of sending the first message.

In an optional implementation, the first indication information further includes a configuration period of a measurement packet, and the measurement packet includes a training symbol. The second wireless device indicates the configuration period of the measurement packet, and needs to initially send the first message only once within a specific valid time. This can reduce signaling overheads and transmission resources.

In an optional implementation, the measurement packet includes an NDP, and the first message includes an NDPA.

In an optional implementation, the first message further carries second indication information, and the second indication information indicates that the measured channel information is used for wireless sensing. The method is applied to wireless sensing. The range that needs to be met by feedback is set for the channel information variation determined by measurement. In this way, the first wireless device selectively feeds back the measurement report related to the channel information, to reduce message traffic in wireless sensing measurement. The second wireless device can also quickly learn a status of a detectable target around the first wireless device. This helps improve efficiency of wireless sensing application analysis, and implement a wireless sensing function at a low cost.

Figure 19:
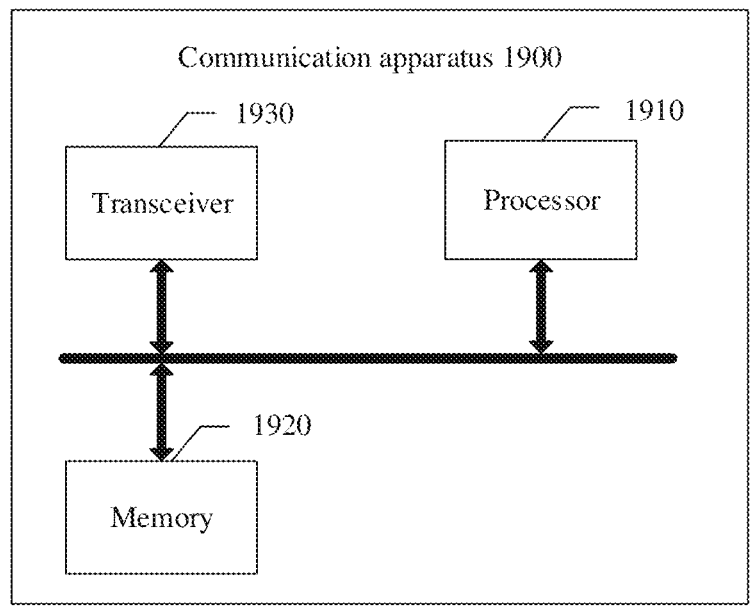
FIG. 19 is a schematic diagram 1 of a structure of a communication apparatus according to an embodiment.

Based on a same concept, as shown in FIG. 19, an embodiment provides a communication apparatus 1900. For example, the communication apparatus 1900 may be a chip or a chip system. Optionally, in this embodiment, the chip system may include a chip, or may include the chip and another discrete device.

The communication apparatus 1900 may include at least one processor 1910. The processor 1910 is coupled to a memory. Optionally, the memory may be located inside or outside the apparatus. For example, the communication apparatus 1900 may further include at least one memory 1920. The memory 1920 stores a computer program, program instructions, and/or data that are/is necessary for implementing any one of the foregoing embodiments. The processor 1910 may execute the computer program stored in the memory 1920, to implement the method in any one of the foregoing embodiments.

Coupling in this embodiment is indirect coupling or a communication connection between apparatuses, units, or modules, may be in electrical, mechanical, or other forms, and is used for information exchange between the apparatuses, the units, and the modules. The processor 1910 may cooperate with the memory 1920.

The communication apparatus 1900 may further include a transceiver 1930, and the communication apparatus 1900 may exchange information with another device by using the transceiver 1930. The transceiver 1930 may be a circuit, a bus, a transceiver, or any other apparatus that may be used for information exchange.

In a possible implementation, the communication apparatus 1900 may be applied to a first wireless device. For example, the communication apparatus 1900 may be the first wireless device, or may be an apparatus that can support the first wireless device in implementing a function of the first wireless device in any one of the foregoing embodiments. The memory 1920 stores a computer program, program instructions, and/or data that are/is necessary for implementing a function of the first wireless device in any one of the foregoing embodiments. The processor 1910 may execute the computer program stored in the memory 1920, to implement the method performed by the first wireless device in any one of the foregoing embodiments.

In another possible implementation, the communication apparatus 1900 may be applied to a second wireless device. For example, the communication apparatus 1900 may be the second wireless device, or may be an apparatus that can support the second wireless device in implementing a function of the second wireless device in any one of the foregoing embodiments. The memory 1920 stores a computer program, program instructions, and/or data that are/is necessary for implementing a function of the second wireless device in any one of the foregoing embodiments. The processor 1910 may execute the computer program stored in the memory 1920, to implement the method performed by the second wireless device in any one of the foregoing embodiments.

The communication apparatus 1900 provided in this embodiment may be applied to a first wireless device to implement the method performed by the first wireless device, or may be applied to a second wireless device to implement the method performed by the second wireless device. Therefore, for effects that can be achieved by the communication apparatus, refer to the foregoing method embodiments. Details are not described herein again.

In this embodiment, a specific connection medium between the transceiver 1930, the processor 1910 and the memory 1920 is not limited. In this embodiment of this application, the memory 1920, the processor 1910, and the transceiver 1930 are connected through a bus in FIG. 19, and the bus is represented by using a bold line in FIG. 19. A connection manner between other components is merely an example for description, and is not limited thereto. Buses may be classified into an address bus, a data bus, a control bus, and the like. For ease of representation, only one bold line is used to represent the bus in FIG. 19, but this does not mean that there is only one bus or only one type of bus.

In the embodiment, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams in the embodiments. The general-purpose processor may be a microprocessor or any conventional processor or the like. The steps of the methods with reference to the embodiments may be directly performed and completed by a hardware processor, or may be performed and completed by using a combination of hardware and software modules in the processor.

In embodiments, the memory may be a nonvolatile memory, for example, a hard disk drive (HDD) or a solid-state drive (SSD), or may be a volatile memory such as a random access memory (RAM). The memory may alternatively be any other medium that can be configured to carry or store expected program code in a form of an instruction or a data structure and that can be accessed by a computer. This is not limited thereto. The memory in the embodiment may alternatively be a circuit or any other apparatus that can implement a storage function, and is configured to store the computer program, the program instruction, and/or the data.

Figure 20:
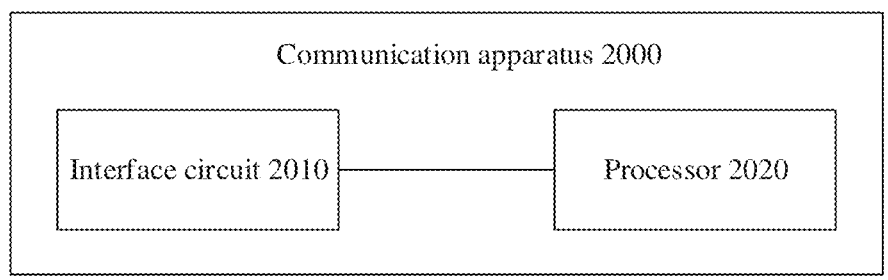
FIG. 20 is a schematic diagram 2 of a structure of a communication apparatus according to an embodiment.

Based on the foregoing embodiments, as shown in FIG. 20, an embodiment further provides another communication apparatus 2000, including an interface circuit 2010 and a processor 2020. The interface circuit 2010 is configured to receive code instructions and transmit the code instructions to the processor. The processor 2020 is configured to run the code instructions to perform the method performed by the first wireless device or the method performed by the second wireless device in any one of the foregoing embodiments. The communication apparatus 2000 provided in this embodiment may be applied to a first wireless device to perform the method performed by the first wireless device, or may be applied to a second wireless device to perform the method performed by the second wireless device. Therefore, for effects that can be achieved by the communication apparatus, refer to the foregoing method embodiments. Details are not described herein again.

Based on the foregoing embodiments, an embodiment further provides a communication system. The communication system includes at least one communication apparatus applied to a first wireless device and at least one communication apparatus applied to a second wireless device. For effects that can be achieved by the communication system, refer to the foregoing method embodiments. Details are not described herein again.

Based on the foregoing embodiments, an embodiment further provides a computer-readable storage medium. The computer-readable storage medium stores instructions, and when the instructions are executed, the method performed by the first wireless device or the method performed by the second wireless device in any one of the foregoing embodiments is implemented. The computer-readable storage medium may include any medium that can store program code, such as a USB flash drive, a removable hard disk, a read-only memory, a random access memory, a magnetic disk, or an optical disc.

To implement the functions of the communication apparatuses in FIG. 19 to FIG. 20, an embodiment further provides a chip, including a processor, configured to support the communication apparatus in implementing the functions of the first wireless device or the second wireless device in the foregoing method embodiments. In a possible implementation, the chip is connected to a memory or the chip includes the memory, and the memory is configured to store program instructions and data that are necessary for the communication apparatus.

A person skilled in the art should understand that embodiments may be provided as a method, a system, or a computer program product. Therefore, the embodiments may use a form of hardware only embodiments, software only embodiments, or embodiments with a combination of software and hardware. In addition, the embodiments may use a form of a computer program product that is implemented on one or more computer-usable storage media (including, but not limited to, a disk memory, a CD-ROM, an optical memory, and the like) that include computer-usable program code.

is the embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

A person skilled in the art can make various modifications and variations to embodiments without departing from the scope of the embodiments. In this case, is the embodiments and their descriptions are intended to cover these modifications and variations.

What is claimed is:

1. A channel information feedback method, applied to a first wireless device, the method and comprising:
  receiving a message from a second wireless device,
  wherein the message notifies channel information measurement,
  the message carries first indication information related to the first wireless device, and
  the first indication information indicates a feedback condition;
  performing channel information measurement based on the message;
  determining channel information variation comprising a first channel information variation based on currently measured channel information and historically measured channel information;
  wherein the first indication information comprises either a first sensitivity level, or a sensitivity level range; and
  feeding back a measurement report to the second wireless device when the first channel information variation meets the feedback condition.

2. The channel information feedback method according to claim 1,
  wherein the first indication information comprises a first variation threshold, and
  the feedback condition is that the channel information variation is greater than or equal to the first variation threshold,
  or
  the feedback condition is that the channel information variation is less than or equal to the first variation threshold.

3. The channel information feedback method according to claim 2,
  wherein the first indication information further comprises a first identifier,
  the first identifier indicates a first channel information variation evaluation algorithm, and
  the feedback condition is that the channel information variation is greater than or equal to the first variation threshold.

4. The channel information feedback method according to claim 2,
  wherein the first indication information further comprises a first identifier,
  the first identifier indicates a second channel information variation evaluation algorithm, and
  the feedback condition that the channel information variation is less than or equal to the first variation threshold.

5. The channel information feedback method according to claim 2,
  wherein the first indication information further comprises a second identifier that indicates an interval mapping algorithm, and
  the determining the first channel information variation based on currently measured channel information and historically measured channel information comprises:
    comparing the currently measured channel information with the historically measured channel information to obtain a second channel information variation; and
    processing the second channel information variation based on the interval mapping algorithm to obtain the first channel information variation,
  wherein the first channel information variation is in a first interval, and
  the first interval comprises the first variation threshold,
  or
  the first interval comprises the second variation threshold and the third variation threshold.

6. The channel information feedback method according to claim 1,
  wherein the first indication information comprises
    a second variation threshold and
    a third variation threshold, and
  the feedback condition is that the channel information variation is greater than or equal to the second variation threshold, and
  the channel information variation is less than or equal to the third variation threshold.

7. The channel information feedback method according to claim 1,
  wherein, the first sensitivity level is related to a first variation threshold, and
  the feedback condition is that the channel information variation is greater than or equal to the first variation threshold,
  or
  the feedback condition is that the channel information variation is less than or equal to the first variation threshold.

8. The channel information feedback method according to claim 1,
  wherein the first sensitivity level is related to a second variation threshold and a third variation threshold, and
  the feedback condition is that the channel information variation is greater than or equal to the second variation threshold, and
  the channel information variation is less than or equal to the third variation threshold.

9. The channel information feedback method according to claim 1,
  wherein the sensitivity level range comprises at least one sensitivity level, and
  a variation threshold related to the at least one sensitivity level is used for determining the feedback condition.

10. The channel information feedback method according to claim 1,
  wherein the message comprises a null data packet announcement (NDPA).

11. An apparatus, comprising:
  a processor; and a memory, storing instructions, which when executed by the processor, cause the apparatus to:
  receive a message from a second wireless device,
    wherein the message notifies channel information measurement,
    the message carries first indication information related to the apparatus, and
    the first indication information indicates a feedback condition;
  perform channel information measurement based on the message;
  determine channel information variation comprising a first channel information variation based on currently measured channel information and historically measured channel information
  wherein the first indication information comprises either a first sensitivity level, or a sensitivity level range; and feed back a measurement report to the second wireless device when the first channel information variation meets the feedback condition.

12. The apparatus according to claim 11, wherein the first indication information comprises a first variation threshold, and
the feedback condition is that the channel information variation is greater than or equal to the first variation threshold,
or
the feedback condition is that the channel information variation is less than or equal to the first variation threshold.

13. The apparatus according to claim 12, wherein the first indication information further comprises a first identifier,
the first identifier indicates a first channel information variation evaluation algorithm,
the first identifier indicates a first channel information variation evaluation algorithm, and
the feedback condition is that the channel information variation is greater than or equal to the first variation threshold.

14. The apparatus according to claim 12, wherein the first indication information further comprises a first identifier,
the first identifier indicates a second channel information variation evaluation algorithm,
the first identifier indicates a second channel information variation evaluation algorithm, and
the feedback condition is that the channel information variation is less than or equal to the first variation threshold.

15. The apparatus according to claim 12, wherein the first indication information further comprises a second identifier that indicates an interval mapping algorithm,
and the instructions cause the apparatus to:
compare the currently measured channel information with the historically measured channel information to obtain a second channel information variation; and
process the second channel information variation based on the interval mapping algorithm, to obtain the first channel information variation,
wherein the first channel information variation is in a first interval, and
the first interval comprises the first variation threshold, or
the first interval comprises the second variation threshold and the third variation threshold.

16. The apparatus according to claim 11, wherein the first indication information comprises
a second variation threshold and
a third variation threshold, and
the feedback condition is that the channel information variation is greater than or equal to the second variation threshold, and
the channel information variation is less than or equal to the third variation threshold.

17. The apparatus according to claim 11, wherein the first sensitivity level is related to a first variation threshold, and
the feedback condition is that the channel information variation is greater than or equal to the first variation threshold,
or
the feedback condition is that the channel information variation is less than or equal to the first variation threshold.

18. The apparatus according to claim 11, wherein he first sensitivity level is related to a second variation threshold and a third variation threshold, and
the feedback condition is that the channel information variation is greater than or equal to the second variation threshold, and
the channel information variation is less than or equal to the third variation threshold.

19. The apparatus according to claim 11, wherein
the sensitivity level range comprises at least one sensitivity level, and
a variation threshold related to the at least one sensitivity level is used for determining the feedback condition.

20. The apparatus according to claim 11, wherein the first message comprises a null data packet announcement (NDPA).

* * * * *